US009182582B2

(12) United States Patent
Inoue

(10) Patent No.: US 9,182,582 B2
(45) Date of Patent: Nov. 10, 2015

(54) OBSERVATION DEVICE AND METHOD THAT PERFORMS COMPENSATION CONTROL AS A FIRST DRIVING AND A SECOND DRIVING

(75) Inventor: Takahiro Inoue, Hirakata (JP)

(73) Assignee: Panasonic Healthcare Holdings Co., Ltd., Tokyo (JP)

( * ) Notice: Subject to any disclaimer, the term of this patent is extended or adjusted under 35 U.S.C. 154(b) by 1046 days.

(21) Appl. No.: 12/692,992

(22) Filed: Jan. 25, 2010

(65) Prior Publication Data
US 2010/0188743 A1 Jul. 29, 2010

(30) Foreign Application Priority Data

Jan. 29, 2009 (JP) ................................. 2009-018673

(51) Int. Cl.
G02B 21/26 (2006.01)
G02B 21/34 (2006.01)
G02B 21/36 (2006.01)
G02B 21/24 (2006.01)

(52) U.S. Cl.
CPC .............. G02B 21/26 (2013.01); G02B 21/367 (2013.01); G02B 21/241 (2013.01); G02B 21/248 (2013.01)

(58) Field of Classification Search
CPC ........ G02B 21/24; G02B 21/26; G02B 21/34; G02B 21/0088; G02B 21/241; G02B 21/242; G02B 21/248; G02B 21/367; G02N 1/312
USPC ............. 359/391–393, 368; 250/201.1–201.4
See application file for complete search history.

(56) References Cited

U.S. PATENT DOCUMENTS

| 5,587,833 | A | * | 12/1996 | Kamentsky | 359/393 |
| 7,557,988 | B2 | * | 7/2009 | Okugawa | 359/395 |
| 2003/0128348 | A1 | * | 7/2003 | Nishi | 355/53 |
| 2007/0057196 | A1 | | 3/2007 | Matsushima | |
| 2008/0165416 | A1 | * | 7/2008 | Ariga et al. | 359/393 |

FOREIGN PATENT DOCUMENTS

| EP | 1517168 A2 | 3/2005 |
| JP | 2005-092152 A | 4/2005 |
| JP | 2006-023175 A | 1/2006 |

* cited by examiner

Primary Examiner — Zachary Wilkes
Assistant Examiner — Tamara Y Washington
(74) Attorney, Agent, or Firm — Phillip J. Articola; Mots Law, PLLC

(57) ABSTRACT

An observation device according to the present invention comprises a stage on which a fluid vessel containing therein an object to be observed such as a cell or microorganism is to be placed, an observing part observing the object to be observed, a driving part performing a stage driving for moving a position of the stage with respect to the observing part, and a control part controlling the stage driving performed by the driving part. The stage driving includes a moving mode for moving the stage toward a predetermined position and a stop process mode for performing a stop process of stopping the stage at the predetermined position, and the control part performs the stop process several times in the stop process mode, and controls the stage driving so that a velocity or an acceleration of the stage driving is common among the stop processes in the stop process mode.

15 Claims, 20 Drawing Sheets

[CONVENTIONAL OPERATION OF 600in]

| | CURRENT DRIVING DIRECTION | IMMEDIATELY BEFORE STOP | NEXT DRIVING DIRECTION |
|---|---|---|---|
| (1) | CCW | CCW ⇒ CW | CW |
| (2) | CW | (STOP WITHOUT FURTHER OPERATION) | CW |

601in

[OPERATION OF 600in IN THIS EMBODIMENT]

| | CURRENT DRIVING DIRECTION | IMMEDIATELY BEFORE STOP | NEXT DRIVING DIRECTION |
|---|---|---|---|
| (1) | CCW | CCW ⇒ CW | CW/CCW |
| (2) | CW | CCW ⇒ CW | CW/CCW |

OBSERVATION DEVICE AND METHOD THAT PERFORMS COMPENSATION CONTROL AS A FIRST DRIVING AND A SECOND DRIVING

The application Number 2009-018673, upon which this patent application is based, is hereby incorporated by reference.

BACKGROUND OF THE INVENTION

1. Field of the Invention

The present invention relates to observation devices, observation systems, control devices, and control programs, and is suitable particularly for a biotechnological observation using a microscope.

2. Description of Related Art

Observation devices using a microscope are used in the fields of medicine, biology and the like in order to accurately capture a minute object to be observed such as a cell or microorganism (This includes bacteria, virus and the like, and is hereinafter referred to as a cell or the like). This observation device comprises a stage on which a fluid vessel or the like containing therein the object to be observed is placed, a driving part electrically moving the stage, and an observing part observing the object to be observed (observation object). In this observation device, the observation object is automatically moved to change the observed area. In the case where the observation object is periodically observed, it is required that the stage is stopped at the same position every time the stage is moved.

In the driving part moving the stage on which the observation object is placed by using an electric motor or the like, a mechanism interposed between a motor part and the stage includes a mechanical operation part such as a gear, pulley and the like. It is known that a backlash occurs in the mechanical operation part due to play and rattling between the gears, or in the gear itself or the pulley. Therefore, in the case where the mechanism is not a mechanism which is provided with a position sensor and performs feedback control using position information regarding the stage from the position sensor, for example, in the case where the position of the stage is controlled based on the number of rotations of the electric motor or the like, the actual position of the stage cannot necessarily be obtained from the number of rotations of the electric motor due to generation of a lost motion caused by the backlash. Therefore, in the control using the number of rotations of the electric motor, an error (hereinafter referred to simply as a movement error or a position error) occurs in an actual stop position of the stage every time the stage is driven. This position error due to the lost motion caused by the backlash has an unignorable influence in a field in which the observation object is minute.

In order to solve the backlash due to the influence of the play between the gears, it has been suggested a technique of storing information of a rotation direction of the gear at the time of stopping the gear to control the movement of the stage using the information so that the rotation direction at the time of stopping the gear is always the same.

In the mechanical operation part such as the gear, pulley and the like described above, (i) there is a lost motion due to stiffness, mass or the like as well as the lost motion due to the backlash described above. In other words, the lost motion occurs due to generation of twisting, distortion, or slip of the gear, a rotation axis part of the pulley, a tooth part of the gear, a surface part of the pulley or the like forming the mechanical operation part depending on the stiffness, mass or the like of materials of these parts. Also, regarding a chain or belt forming the mechanical operation part, the lost motion occurs due to the generation of expansion and contraction, twisting, or distortion depending on the stiffness, mass or the like of materials of the chain or belt. The above mentioned lost motion occurs because a part of the torque of a sender is absorbed due to the twisting, distortion, or the like described above, and the absorbed torque is not transmitted to a receiver. The lost motion depending on the stiffness, mass or the like causes the position error of the stage.

Additionally, the position error of the stage occurs not only due to the lost motion depending on the stiffness, mass or the like, but also due to moving acceleration or the like depending on the stiffness, mass or the like. That is, (ii) since moving velocity, moving acceleration or the like of the observation object (stage) at the time of performing a control for stopping the stage is not uniform most of the times, the state of the twisting, distortion, or the like of the axis part or the tooth part of the gear varies each time the stage is stopped, resulting in the position error such that the stop position of the stage is different every time the stage is moved.

The movement error and the position error of the stage due to the stiffness, mass or the like described above in (i) and (ii) are hereinafter referred to simply as a "position error due to stiffness, mass or the like".

The conventional art discloses solutions to the problem of only the lost motion due to the backlash such as play, rattling or the like between the gears, and cannot handle the position error due to the stiffness, mass or the like described above. In other words, although, in the conventional art, the information of the stop position and the movement direction of the stage is stored in order to solve the problem of the lost motion due to the backlash, the conventional art does not disclose storing the velocity and acceleration in a stage driving. Accordingly, the velocity and acceleration in the stage driving are not considered in the conventional art, and it is not possible to handle a position error due to stiffness, mass or the like described above only by considering the position and the movement direction of the stage without considering the velocity and acceleration of the stage driving.

SUMMARY OF THE INVENTION

In view of above described problem, an object of the present invention is to provide an observation device, an observation system, a control device, and a control program which can handle not only the backlash but also the position error due to stiffness, mass or the like.

A first observation device according to the present invention comprises a stage on which a fluid vessel containing therein an object to be observed such as a cell or microorganism is to be placed, an observing part observing the object to be observed, a driving part performing a stage driving for moving a position of the stage with respect to the observing part, and a control part controlling the stage driving performed by the driving part. The stage driving includes a moving mode for moving the stage toward a predetermined position and a stop process mode for performing a stop process of stopping the stage at the predetermined position, and the control part performs a compensation control as the stop process in the stop process mode. In the compensation control, the control part performs a first driving and a second driving after the first driving, and then stops the stage driving. The first driving is for changing the position of the stage with respect to the observing part in a predetermined direction in accordance with a first driving parameter which is a parameter regarding a velocity or an acceleration of the stage driving. The second driving is for changing the position of the stage with respect to the observing part in a direction opposite to the predetermined direction in accordance with a second driving parameter which is a parameter regarding the velocity or the acceleration of the stage driving.

Thus, not only the backlash, but also the position error due to stiffness, mass or the like can be handled.

A second observation device according to the present invention is the first observation device described above, and further comprises a memory storing information including the position of the stage used when the control part controls the stage driving. The compensation control is performed in both the stage driving for moving the stage to the predetermined position in order for the memory to store the predetermined position of the stage and the stage driving for moving the stage to the predetermined position which is stored in the memory.

Thus, not only the backlash, but also the position error due to stiffness, mass or the like can be handled in both the stage driving for moving the stage to the predetermined position in order for the memory to store the predetermined position of the stage and the stage driving for moving the stage to the predetermined position which is stored in the memory.

A third observation device according to the present invention is the first or second observation device described above, wherein the driving part includes an X-axis driving section driving the stage in an X-axis direction and a Y-axis driving section driving the stage in a Y-axis direction which is perpendicular to the X-axis direction, and the control part performs the compensation control on the X-axis driving section and the compensation control on the Y-axis driving section when performing the stage driving in the X-axis direction or the stage driving in the Y-axis direction.

In the above description, the predetermined direction in the compensation control is a positive and negative direction of the X-axis direction in the X-axis driving section and a positive and negative direction of the Y-axis direction in the Y-axis driving section.

By performing the compensation control on the X-axis driving section and the compensation control on the Y-axis driving section, not only the backlash, but also the position error due to stiffness, mass or the like can be handled in the case where the drive in one of the axis directions affects the drive in the other axis direction.

An observation system according to the present invention comprises: any one of the first to third observation devices described above; a cabinet which accommodates therein the observing part and the stage included in the observation device, includes a putting into/taking out part putting the fluid vessel into and taking the fluid vessel out, and is sealed off from outside; and an environment maintaining device maintaining a predetermined environment in the cabinet.

In the fields of medicine and biology, when the cabinet is sealed off from outside, the cabinet is biologically sealed, and has a function of preventing disturbances from entering the inside from the outside of the cabinet. The disturbances include a gas, grit, dust, bacteria, microorganism and the like which could possibly be contaminating material which contaminates the inside of the cabinet in a process of the cell culturing, bacteria culturing, microorganism culturing, material synthesis, and the like.

A control program according to the present invention is a control program which makes a computer function as a control device used in an observation device comprising a stage on which a fluid vessel containing therein an object to be observed such as a cell or microorganism is to be placed, an observing part observing the object to be observed, and a driving part performing a stage driving for moving a position of the stage with respect to the observing part. The stage driving includes a moving mode for moving the stage toward a predetermined position and a stop process mode for performing a stop process of stopping the stage at the predetermined position. The control program makes the computer: control the stage driving performed by the driving part; and perform a compensation control as the stop process in the stop process mode. In the compensation control, the computer performs a first driving and a second driving after the first driving, and then stops the stage driving. The first driving is for changing the position of the stage with respect to the observing part in a predetermined direction in accordance with a first driving parameter which is a parameter regarding a velocity or an acceleration of the stage driving. The second driving is for changing the position of the stage with respect to the observing part in a direction opposite to the predetermined direction in accordance with a second driving parameter which is a parameter regarding the velocity or the acceleration of the stage driving.

Another observation device according to the present invention comprises a stage on which a fluid vessel containing therein an object to be observed such as a cell or microorganism is to be placed, an observing part observing the object to be observed, a driving part performing a stage driving for moving a position of the stage with respect to the observing part, and a control part controlling the stage driving performed by the driving part. The stage driving includes a moving mode for moving the stage toward a predetermined position and a stop process mode for performing a stop process of stopping the stage at the predetermined position, and the control part performs the stop process several times in the stop process mode, and controls the stage driving so that a velocity or an acceleration of the stage driving is common among the stop processes in the stop process mode.

A control device according to the present invention is a control device used in an observation device comprising a stage on which a fluid vessel containing therein an object to be observed such as a cell or microorganism is to be placed, an observing part observing the object to be observed, and a driving part performing a stage driving for moving a position of the stage with respect to the observing part. The stage driving includes a moving mode for moving the stage toward a predetermined position and a stop process mode for performing a stop process of stopping the stage at the predetermined position, and the control device controls the stage driving performed by the driving part and performs a compensation control as the stop process in the stop process mode. In the compensation control, the control device performs a first driving and a second driving after the first driving, and then stops the stage driving. The first driving is for changing the position of the stage with respect to the observing part in a predetermined direction in accordance with a first driving parameter which is a parameter regarding a velocity or an acceleration of the stage driving. The second driving is for changing the position of the stage with respect to the observing part in a direction opposite to the predetermined direction in accordance with a second driving parameter which is a parameter regarding the velocity or the acceleration of the stage driving.

In the description above, the compensation control is a control for, "in the stop process mode, performing a first driving for changing the position of the stage with respect to the observing part in a predetermined direction in accordance with a first driving parameter which is a parameter regarding a velocity or an acceleration of the stage driving, thereafter performing a second driving for changing the position of the stage with respect to the observing part in a direction opposite to the predetermined direction in accordance with a second driving parameter which is a parameter regarding the velocity or the acceleration of the stage driving, and then stopping the stage driving." The compensation control may be performed a plurality of times instead of only once.

In the case where the stage driving is accelerated from an initial velocity to a final velocity and thereafter decelerated from the final velocity to the initial velocity, not only the backlash, but also the position error due to stiffness, mass or the like can be handled.

In the description above, although the movement direction of the position of the stage with respect to the observing part is arbitrary, the predetermined direction in the compensation control is the same direction as a driving direction of the driving part or a direction opposite to the driving direction of the driving part.

The driving parameter is a parameter associated with the position or drive of the stage, such as, as well as the velocity of the stage, the acceleration of the stage, the position of the stage (x-y coordinate or the like), a time required for the acceleration or deceleration or the movement of the stage, an external force applied to the stage, a rotation velocity or a rotation acceleration of a gear or a pulley used in the driving part, a torque of the gear or the pulley, the number of pulses or a frequency of the pulse of a stepping motor used in the driving part, or the like.

DETAILED DESCRIPTION OF THE PREFERRED EMBODIMENT

A preferred embodiment of the present invention is described in detail below with reference to the drawings.

In this embodiment, the observation object in a flask (fluid vessel) is a cell under culture. The fluid vessel includes, for example, a prepared slide, a petri dish, a dish, and a well, as well as the flask. Also, the observation object contained in the fluid vessel includes, for example, microorganism including bacteria or virus.

(Configuration)

Figure 1:
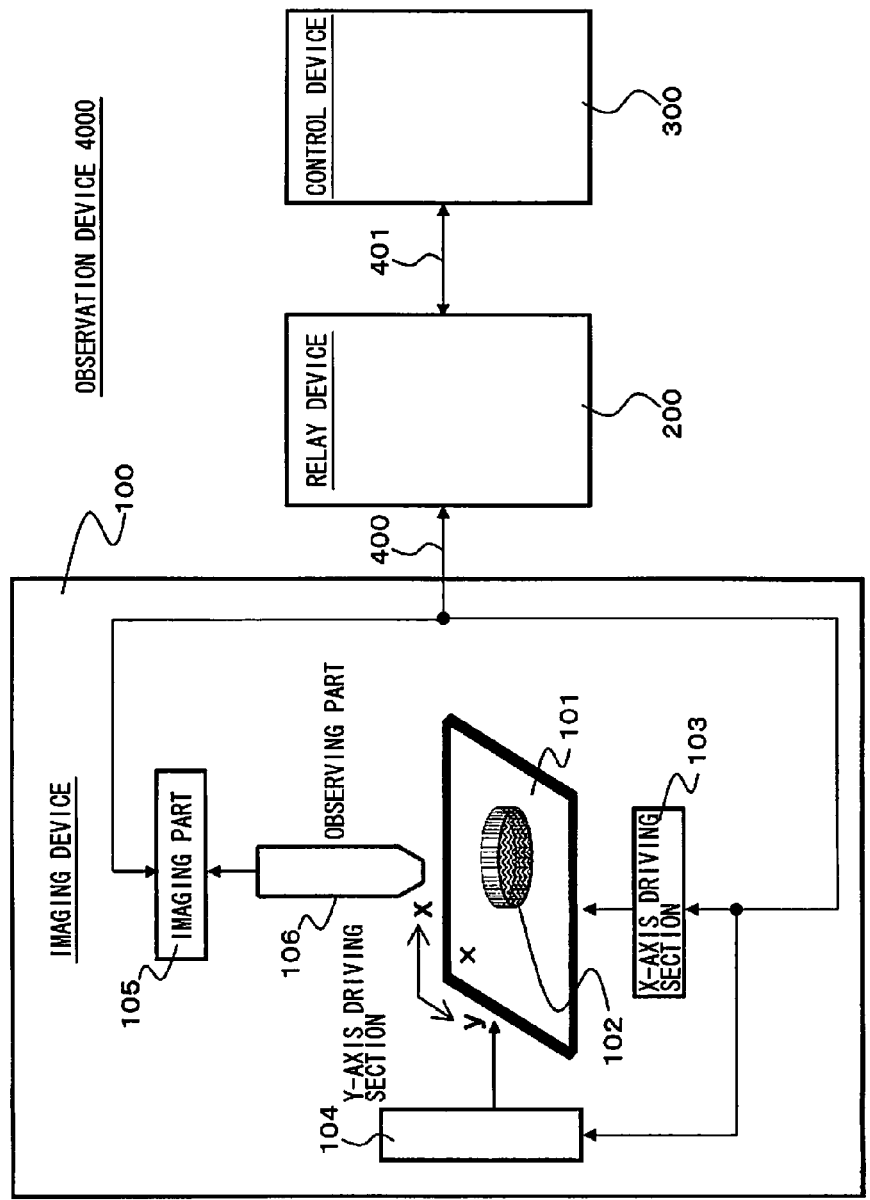
FIG. 1 is a view for explaining a configuration of an observation device according to an embodiment of the present invention.

FIG. 1 shows a configuration of an observation device 4000 according to the embodiment, and additionally shows a configuration diagram of an imaging device 100.

In this embodiment, as shown in FIG. 1, the observation device 4000 comprises the imaging device 100, a relay device 200, and a control device 300. The imaging device 100 and the relay device 200 are connected to each other via a communication wire 400, while the relay device 200 and the control device 300 are connected to each other via a communication wire 401. The observation device may be integrated instead of being divided into the imaging device 100, the relay device 200, and the control device 300.

The imaging device 100 comprises an observing part 106 performing observation and imaging of an observation object contained in a fluid vessel 102, and an imaging part 105 functioning as an interface between the observing part 106 and the control device 300. The imaging part 105, for example, controls the observing part 106. An image sensor such as a CCD, a CMOS camera and the like exists in the observing part 106. The imaging part 105 and the observing part 106 enable photomicroscopy, and imaging of a closeup picture, closeup moving pictures or the like of the observation object contained in the fluid vessel 102.

The imaging device 100 also includes a stage 101 on which the fluid vessel 102 is placed, an x-axis driving section 103 driving the stage 101 to move (hereinafter referred to as stage driving) in an x-axis direction of the stage 101 with respect to the observing part 106, a y-axis driving section 104 performing the stage driving of the stage 101 in a y-axis direction of the stage 101 with respect to the observing part 106. The x-axis driving section 103 and the y-axis driving section 104 are formed by a drive source such as a stepping motor or the like (the stepping motor is employed in this embodiment). In this embodiment, employed is a mechanism controlling the location of the stage 101 by using the number of rotations of the stepping motor, but not a mechanism which is provided with a position sensor or the like and performs feedback control using position information regarding the stage 101 from the position sensor. The x-axis and the y-axis can be arbitrarily defined as long as the x-axis direction and the y-axis direction are perpendicular to each other within a plane perpendicular to an observation and imaging direction of the observing part 106. In this embodiment, the x-axis and the y-axis are defined as shown in FIG. 1. The stage 101, the x-axis driving section 103, and the y-axis driving section 104 allow the fluid vessel 102 to be moved with respect to the observing part 106. Thus, the imaging area which can be imaged by the observing part 106 can be changed, and therefore, the observation object to be observed and imaged can be selected and decided among a plurality of the observation object contained in the fluid vessel 102.

The communication wire 400 and the communication wire 401 allow the imaging device 100 to send the control device 300 imaging data such as an imaging picture of the observation object or the like, motor information regarding status of the motor, sensor information such as measurement values or the like obtained from various sensors (not shown) provided to the imaging device 100, and the like. Also, the communication wire 400 and the communication wire 401 allow the control device 300 to send the motor, the imaging sensor, and the like in the imaging device 100 control information.

Figure 2:
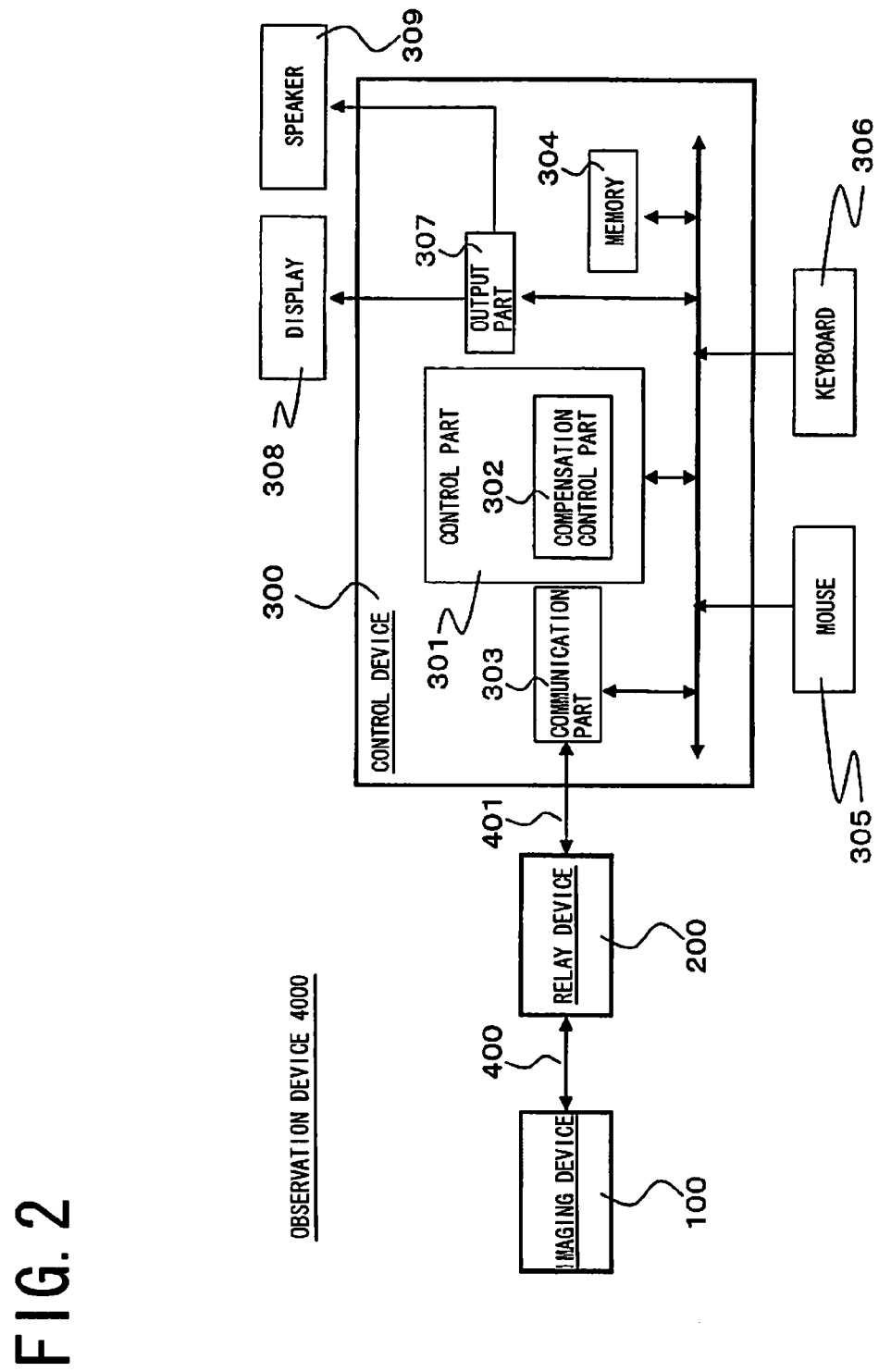
FIG. 2 is a view for explaining the configuration of the observation device according to the embodiment.

FIG. 2 shows a configuration of the control device 300. In this embodiment, the control device 300 is a computer including a CPU and the like.

The control device 300 includes a control part 301 outputting the control information for controlling the stage driving by the x-axis driving section 103 and the y-axis driving section 104 shown in FIG. 1, and a compensation control part 302 performing a compensation control to be described later and existing inside the control part 301. Here, when the compensation control part 302 exists inside the control part 301, the compensation control part 302 performing the compensation control may exist as hardware in the control part 301, or the control part 301 may have a function of the compensation control as software. The control part 301 is formed by a CPU, for example.

The control device 300 further includes: a communication part 303 connected to the communication wire 401; a memory 304 including a RAM, a ROM, a flash memory, or the like; and an output part 307 outputting image data and audio data to a display 308 displaying the imaging picture or a GUI picture of the observation object and to a speaker 309 outputting sound, beep sound, or the like. The control device 300 receives an input from an operator using this device through a mouse 305 and a key board 306. The memory 304 stores information picture data, other computation data, and the like. Here, the information includes a position (for example, x-y coordinate value or the like) of the stage 101 which is used by the control part 301 when performing the stage driving.

With the configuration described above, the control device 300 can perform the control of the imaging part 105 and the observing part 106 (for example, exposure control or control of zoom function, focus function, shutter function, illumination function and the like) in the imaging device 100 shown in FIG. 1, the control of the drive of the x-axis driving section 103 and the y-axis driving section 104, the control of motor driving regarding the zoom function and focus function, and the like. Also, the control device 300 can receive various kinds of information from the imaging device 100 and process the information.

Figure 3:
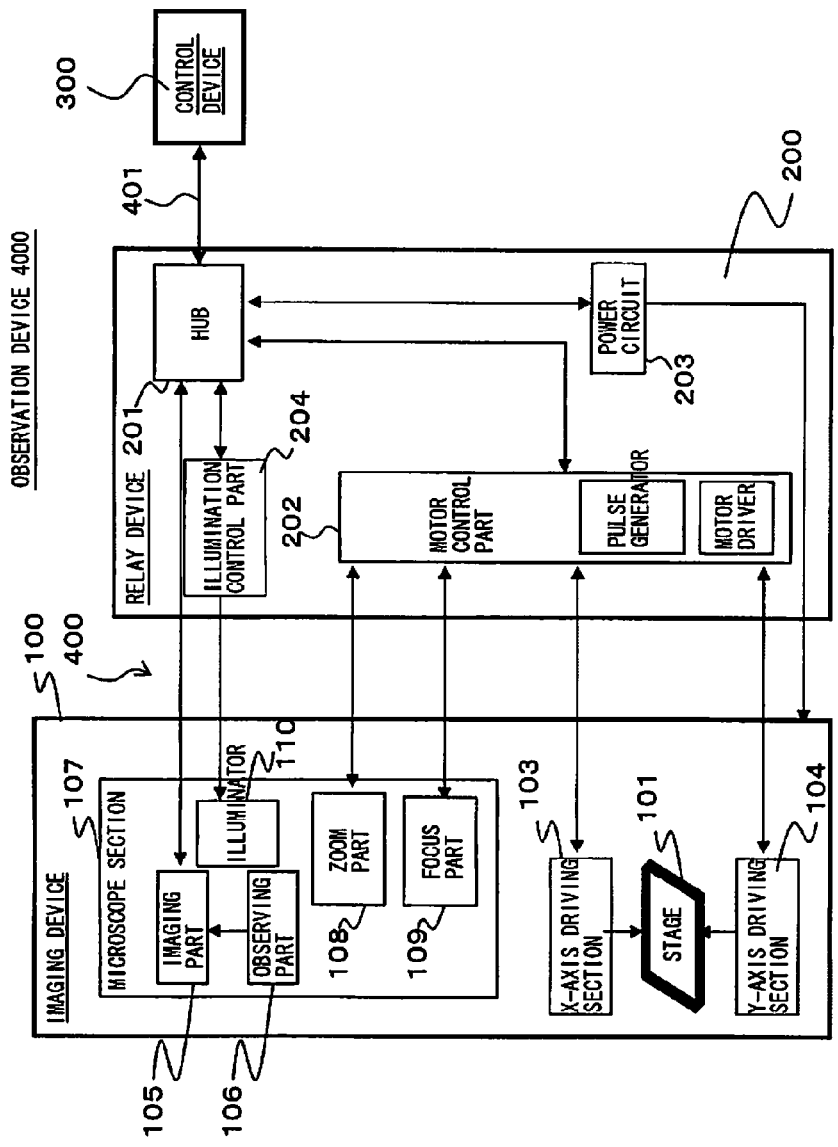
FIG. 3 is a view for explaining the configuration of the observation device according to the embodiment.

FIG. 3 shows a configuration of the relay device 200. FIG. 3 also shows a configuration of the imaging device 100 which is compatible with the relay device 200.

The relay device 200 includes: a HUB 201 branching and relaying a signal from the control device 300 and a signal to the control device 300 through the communication wire 401 connected thereto; a motor control part 202 including a pulse generator, a motor driver generating a control signal of each stepping motor in the imaging device 100, a relay and the like; a power circuit 203 including an electric power conversion device generating and controlling electric power to be distributed to each part; and an illumination control part 204 controlling the dimming of an illuminator 110 included in the imaging device 100. The motor control part 202, the power circuit 203, the illumination control part 204, and the imaging part 105 are connected to the HUB 201.

A pulse signal for driving the stepping motor is outputted from the pulse generator (in the motor control part 202) in order to realize characteristics regarding the driving of the stage 101. The characteristics are decided based on a driving parameter, which is, in this embodiment, the initial velocity, final velocity, acceleration time, deceleration time, acceleration and deceleration characteristics, time duration of constant speed operation and the like of the drive set in a command register or the like of the pulse generator. The acceleration and deceleration characteristics are the way of performing the acceleration and deceleration with respect to a time axis such as, for example, whether the acceleration and deceleration is performed in an S-shaped curve or in a linear manner, or the like. Upon receipt of the pulse signal, a motor driver also existing in the motor control part 202 automatically generates a control signal for actually driving the stepping motor. For example, from the pulse generator, outputted is a pulse changing the frequency thereof with respect to a time axis direction so that the acceleration and deceleration characteristics of the stage 101 are realized. Therefore, in this embodiment, the operator decides only the parameter value set in the pulse generator.

With the configuration described above, the relay device 200 has functions of converting control information from the control device 300 into a signal for actually controlling or driving the element and motor, of relaying the information to be sent to the control device 300, and the like.

The imaging device 100 includes a microscope section 107 as shown in FIG. 3. The microscope section 107 includes an imaging part 105, an observing part 106, the illuminator 110 for illuminating the fluid vessel 102, a zoom part 108 and a focusing part 109. The zoom part 108 and the focus part 109 realize a zoom function and focus function using the observing part 106. The zoom part 108 and the focusing part 109 are formed by the stepping motor or the like, and can adjust a distance between an objective lens (not shown) included in the observing part 106 and the image sensor, and adjust blur in the picture.

As described above, the observation device 4000 can automatically perform the observation and imaging of the observation object contained in the fluid vessel 102 under control of the control device 300 without need of any operation by the operator. For example, the observation device 4000 can have a time lapse function (a function of imaging and recording the culture condition of the cell after an interval), and can record the culture condition of the cell automatically. In the time lapse operation, an observation position where the observing part 106 performs imaging is registered, and the stage 101 is moved to the registered observation position and the observation and imaging are performed at the observation position. This observation and imaging operation allows the memory 304 to store the culture condition of the cell. An incubator 1000 in the description below has this time lapse function.

Figure 4:
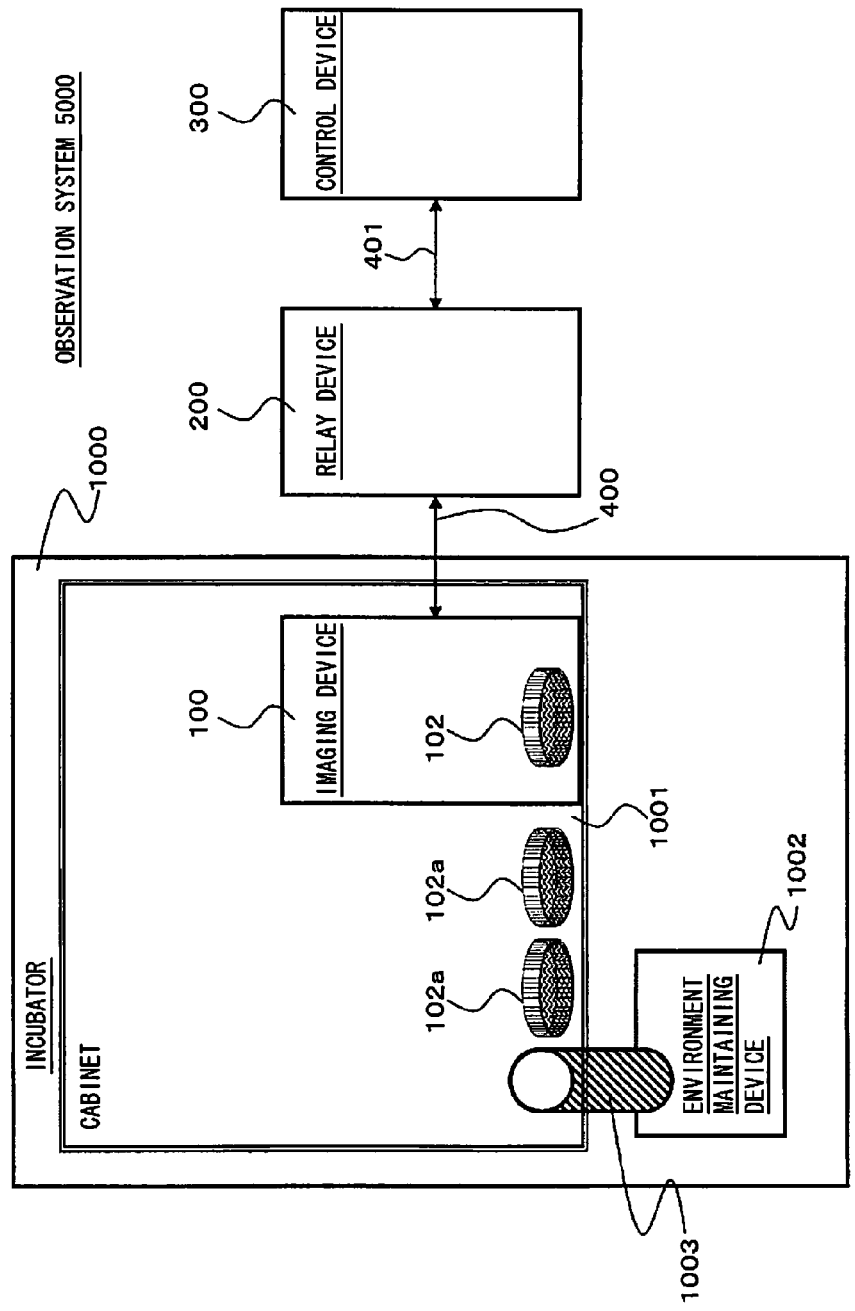
FIG. 4 is a view for explaining a configuration of an observation system according to the embodiment.

FIG. 4 shows a configuration of an observation system 5000. The observation system 5000 comprises the observation device 4000 and the incubator 1000.

The incubator 1000 includes a cabinet 1001 inside of which is sealed off from outside and is sterilized. The cabinet 1001 can store therein fluid vessels 102a and the fluid vessel 102 containing the observation object, a flask, a well, a dish and the like including a cell or the like other than the observation object. The fluid vessel 102 is one of the fluid vessels 102a, one fluid vessel 102a located inside the imaging device 100 is specifically referred to as the fluid vessel 102, while the other fluid vessels located outside the imaging device 100 are referred to as the fluid vessels 102a.

Each fluid vessel separately contains the same kind of cell under the same condition, and one of the fluid vessels is placed on the stage 101 in the imaging device 100 as the fluid vessel 102, and the other fluid vessels are located in the cabinet 1001 as the fluid vessel 102a. The condition on the stage 101 is the same as the condition outside the imaging device 100. The inside of the imaging device 100 is opened to outside thereof and not sealed off from the outside. In other words, the imaging device 100 has a structure in which the device is not sealed by a casing or the like and a stage and an observing part are exposed. In particular, the imaging device 100 has a structure in which even if the casing is provided, the casing is provided with a window or a duct for communicating the inside with the outside of the imaging device 100, and the device is not sealed.

By providing the same surrounding environment to the fluid vessel 102a and the fluid vessel 102, the observation and imaging of the observation object contained in the fluid vessel 102 as a representative allows the observer to grasp a change in the observation object contained in the fluid vessel 102a (and in the fluid vessel 102) and obtain the image of a process of the change, because the observation and imaging of the observation object contained in the fluid vessel 102 means the observation and imaging of the observation object contained in the fluid vessel 102a in the cabinet 1001.

The cabinet 1001 includes a putting into/taking out part (not shown) which can put the fluid vessel 102 and the like to the inside of the cabinet 1001 and take the fluid vessel 102 and the like to the outside of the cabinet 1001. Here, since the cabinet 1001 is provided with a door (not shown), it is kept sealed off from the outside. Incubators are working tables used for the culture of a cell or the like, in which the inside of the cabinet 1001 should be maintained in a predetermined environment such as, for example, an ambient temperature of 37 degrees Celsius, a humidity of 95% or more, and the like. In view of this, the incubator 1000 includes an environment maintaining device 1002 for maintaining the predetermined environment in the cabinet 1001. The inside of the cabinet 1001 and the environment maintaining device 1002 are connected with each other via a connecting part 1003 including a pipe or the like while keeping them sealed off from the outside.

In this embodiment, the cabinet 1001 accommodates therein the imaging device 100, including the observing part 106 and the stage 101, which is a part of the observation device 4000.

In this embodiment, when the cabinet 1001 is sealed off from outside, the cabinet 1001 is biologically sealed, in other words, the cabinet 1001 has a function of preventing disturbances from entering the inside of the cabinet 1001 from the outside thereof. The disturbances include a gas, grit, dust, bacteria, microorganism and the like which could possibly be contaminating material which contaminates the inside of the cabinet 1001 in a process of the cell culturing. By the cabinet 1001 and the door of the cabinet 1001, the inside of the cabinet 1001 is biologically sealed from outside.

With the configuration described above, the incubator 1000 can perform the operation of culturing the cell.

According to this embodiment, it is possible to provide an observation device, observation system, control device, and control program which can handle not only the backlash, but also the position error due to stiffness, mass or the like. This can be achieved because the control part 301 includes a function part (a compensation control part 302) which performs a compensation control. The compensation control is described below.

(Compensation Control)

The stage driving includes a moving mode for moving the stage 101 toward a "predetermined position" desired by the operator, namely, for example, a position of the cell which the operator wishes to observe and image by performing the time lapse operation, and a stop process mode for stopping the stage 101 at the predetermined position. As to the predetermined position, position information of the predetermined position is stored in the memory 304 by a click of an input button of a mouse or the like by the operator prior to the time lapse operation. This position information is, for example, the x-y coordinates derived based on the number of operation pulses of the stepping motor required for moving from the origin, a moving direction or the like in each of x-coordinate and y-coordinate since the feedback control is not performed in this embodiment. The moving mode and the stop process mode are modes regarding the operation concerning the observation and imaging of the observation object, such as the time lapse operation, a registration operation of the position of the stage 101 to be described later and the like. In this embodiment, the stage driving does not include any move of the stage 101 other than the operation concerning the observation and imaging of the observation object.

The compensation control is a control performed by the control part to make a driving part such as the x-axis driving section 103 and the y-axis driving section 104 perform a first driving and then a second driving in the stop process mode described above every time the driving part performs the stage driving to move the stage on which the observation object is placed. In the first driving, the stage is moved in a predetermined direction, and in the second driving thereafter, the stage is moved to a direction opposite to the predetermined direction.

Figures 5A, 5B:
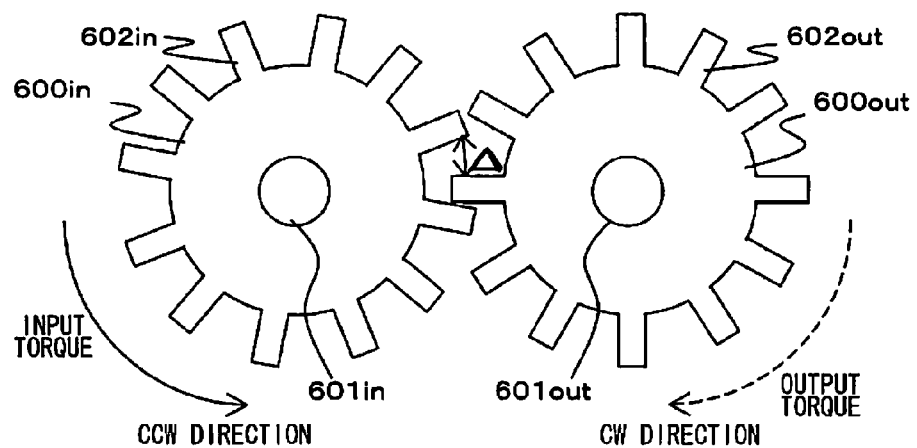
FIGS. 5a to 5d are views for explaining a content of a compensation control in a drive system according to the embodiment.
Figures 5C, 5D:
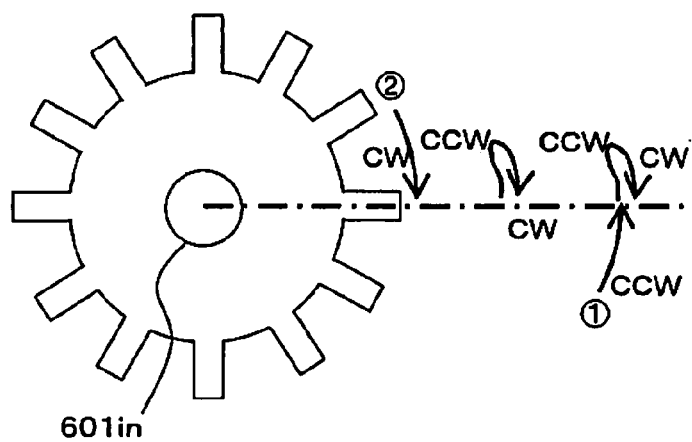

A content of the compensation control to be performed in a drive system related to the driving of the stage 101 is described below with reference to FIGS. 5a to 5d. FIGS. 5a and 5c are views of the gear, and FIGS. 5b and 5d are tables showing three items (in three columns in the tables) of "current driving direction", "operation immediately before stop", and "next driving direction" regarding each of lines (1) and (2) in the tables. FIGS. 5a and 5b are views for explaining prior art, and FIGS. 5c and 5d are views for explaining the content of the compensation control.

Described below is the compensation control between an input side gear and an output side gear in the case where, for example, the input side gear and the output side gear shown in FIG. 5a are included in the drive system of the stage 101.

In FIG. 5a, it is shown that a torque is transmitted from the input side gear 600in to the output side gear 600out. When a direction of a solid arrow shown in FIG. 5a is a CCW (Counter Clock Wise) direction, in the case where the input side gear 600in rotates in the CCW direction, the output side gear 600out rotates in a CW (Clock Wise) direction.

The input side gear 600in includes input side teeth 602in and rotates around an input side axis 601in. In contrast, the output side gear 600out includes output side teeth 602out and rotates around an output side axis 601out. The input side gear 600in receives the torque from the input side axis 601in and transmits the torque to the output side gear 600out via the input side teeth 602in and the output side teeth 602out. The torque is transmitted from the output side gear 600out to the output side axis 601out.

As shown in FIG. 5a, when the input side gear 600in and the output side gear 600out engage with each other, the output side tooth 602out is located between two input side teeth 602in. At this time, one surface of the output side tooth 602out between the two input side teeth 602in is in contact with a surface of one of the input side teeth 602in to receive a power from the input side tooth 602in. In contrast, a gap is defined between the other surface of the output side tooth 602out and a surface of the other input side tooth 602in. In FIG. 5a, a distance of the gap is shown as Δ. It is known that existence of the distance Δ is a main requirement for the input side gear 600in and the output side gear 600out to smoothly rotate while engaging with each other.

With a conventional method, in order to solve the backlash which occurs due to the distance Δ shown in FIG. 5a, measures shown in the table in FIG. 5b are taken. That is, in the case where the input side gear 600in is stopped after rotating in the CCW direction and the driving direction thereafter (namely, next driving direction) is the CW direction, at the time of stop, the rotation of the input side gear 600in is made overrun in the CCW direction and thereafter the input side gear 600in is rotated in the CW direction, and then, the rotation is stopped (Japanese Patent Laid-Open No. 2005-92152). In this case, it is necessary that information of stop position and direction of the move of the gear is stored.

Thus, it is thereby possible to suppress generation of lost motion due to the backlash when the input side gear 600in rotates in the CW direction thereafter. In the case where the input side gear 600in is stopped after rotating in the CW direction and the driving direction thereafter (namely, next driving direction) is the CW direction, at the time of stop, only the stop operation is performed without performing any other operation. The table shown in FIG. 5b shows the case where the next driving direction is the CW direction, but not the case where the next driving direction is the CCW direction. The case where the next driving direction is the CCW direction is omitted because it is easily understood if the reverse of the case where the driving direction is thought.

There is the "position error due to stiffness, mass or the like" in the input side axis 601in and the input side tooth 602in depending on the stiffness, mass or the like of the materials of those elements and attributed to generation of twisting, distortion, or expansion and contraction of the input side axis 601in and the input side tooth 602in. Further, there is the "position error due to stiffness, mass or the like" in the output side axis 601out and the output side tooth 602out depending on the stiffness, the mass or the like of the materials of those elements and attributed to generation of twisting, distortion, expansion and contraction or the like of the output side axis 601out and the output side tooth 602out. Also, there is the "position error due to stiffness, mass or the like" due to the generation of slip between the input side tooth 602in and the output side tooth 602out.

Thus, (A) for example, in the case where the input side gear 600in rotates to transmit rotation torque to the output side gear 600out, the input side gear 600in and the output side gear 600out apply external force to each other. Therefore, twisting, distortion, expansion and contraction or the like is generated in the input side tooth 602in and the output side tooth 602out, for example, due to action and reaction therebetween. Also, (B) for example, twisting, distortion, expansion and contraction or the like is generated in the input side axis 601in and the input side tooth 602in due to action and reaction therebetween, and twisting, distortion, expansion and contraction or the like is generated in the output side axis 601out and the output side tooth 602out due to action and reaction therebetween.

Degree of the twisting, distortion, expansion and contraction or the like depends on: magnitude of the rotation torque; velocity, acceleration or the like of the rotation torque; stiffness, mass or the like of the materials of the rotation axis and the tooth.

In the conventional method described above, the "position error due to stiffness, mass or the like" caused by the generation of the twisting, distortion, expansion and contraction, slip or the like mentioned in (A) and (B) above cannot be handled. In other words, in the conventional method described above, although the information of the stop position or the movement direction of the gear is stored in order to solve the lost motion due to the backlash, the information of the velocity or the acceleration in the rotation direction of the gear is not stored. The position error due to stiffness, mass or the like described above cannot be handled only by considering the position and the movement direction of the stage without considering the velocity and acceleration in the rotation direction of the gear. This is explained below with reference to FIGS. 6a to 6d.

Figure 6A:
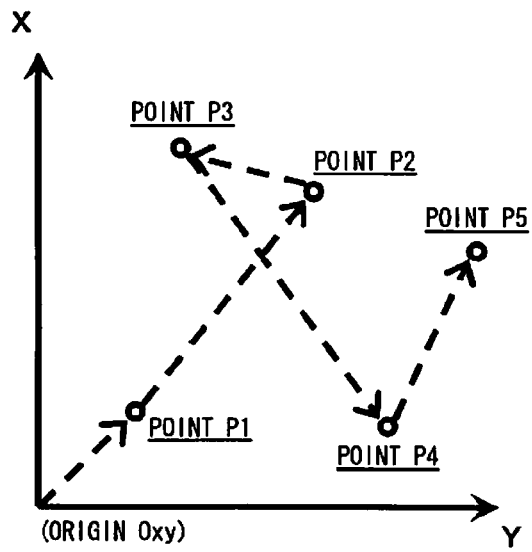
FIGS. 6a to 6d are views showing an order of the movements of an observation point according to the embodiment.
Figure 6B:
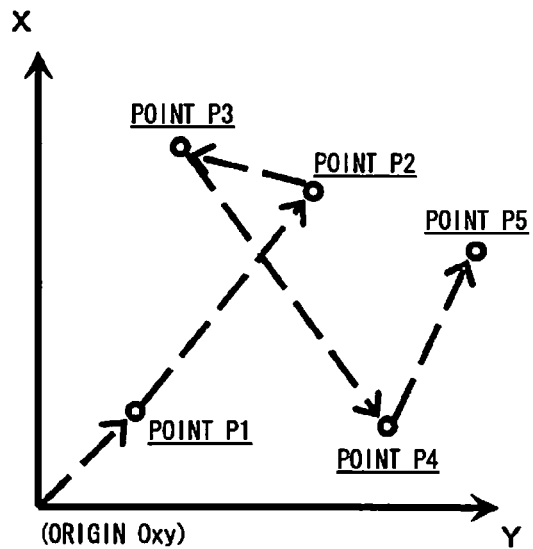
Figure 6C:
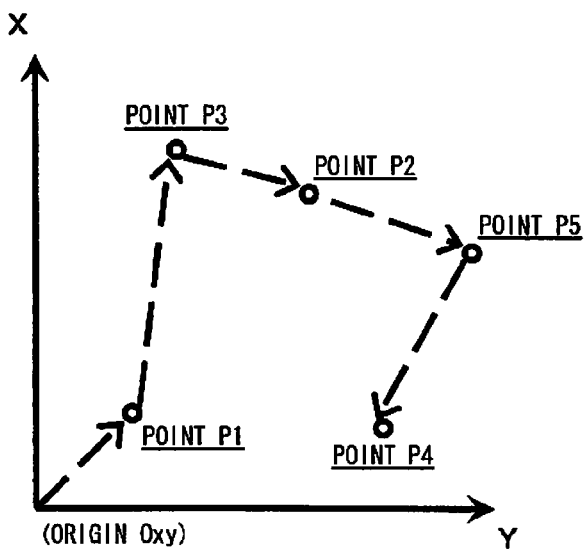

FIGS. 6a to 6d show the order of registration of position (hereinafter referred to as an observation point) of the cell in the x-y plane on the stage 101 where the operator wishes to perform the observation and imaging of the cell in the time lapse operation, and the order of the move of the observation point in the time lapse operation. FIG. 6a shows that the registration is performed in the order of point P1, point P2, point P3, point P4, and point P5 (in the order of arrows shown in FIG. 6a). FIG. 6b shows that the observation and imaging of the observation points in the time lapse operation are performed in the order of point P1, point P2, point P3, point P4, and point P5 (in the order of arrows shown in FIG. 6b). FIG. 6c shows that the observation and imaging of the observation points in the time lapse operation are performed in the order of point P1, point P3, point P2, point P5, and point P4, (in the order of arrows shown in FIG. 6c).

The order shown in FIG. 6b is the same as that shown in FIG. 6a. Therefore, As to (A) for example, the twisting, distortion, expansion and contraction or the like between the input side tooth 602in and the output side tooth 602out, and (B) for example, the twisting, distortion, expansion and contraction or the like between the input side axis 601in and the input side tooth 602in, and the twisting, distortion, expansion and contraction or the like between the output side axis 601out and the output side tooth 602out described above, it is estimated that a state at the time of stop at each observation point during registration and a state at the time of stop at each observation point in the time lapse operation is approximately the same. However, since the order shown in FIG. 6c is not the same as that shown in FIG. 6a, as to (A) and (B) described above, it is not estimated that states of the twisting, distortion, expansion and contraction or the like between the input side tooth 602in and the output side tooth 602out, the twisting, distortion, expansion and contraction or the like between the input side axis 601in and the input side tooth 602in, and the twisting, distortion, expansion and contraction or the like between the output side axis 601out and the output side tooth 602out at the time of stop at each observation point during registration and states of those at the time of stop at each observation point in the time lapse operation are the same.

In prior art, although the stop position and the direction of the move of the gear are considered as described above, the velocity or the acceleration of the gear in the rotation direction are not considered. Therefore, in the case where the order of move of the observation point is different between in the registration and in the time lapse operation (for example, FIGS. 6a and 6c described above) it is not possible to handle the position error due to stiffness, mass or the like. This is because although the position error due to stiffness, mass or the like can be handled if the state mentioned above is the same between in the registration and in the time lapse operation, the position error due to stiffness, mass or the like cannot be handled if the state mentioned above is not the same, i.e. the position error due to stiffness, mass or the like cannot be improved. Also, in the case where another observation point P6 (not shown) is additionally registered after the registration operation shown in FIG. 6a, the tooth of the gear or the axis of the gear at the time of stop at the point P6 is not necessarily in the same state between in the registration and in the time lapse operation. In the conventional art, the velocity or the acceleration in the rotation direction of the gear is not considered, and therefore, the position error due to stiffness, mass or the like cannot be handled with respect to the point P6.

In order to handle these position errors due to stiffness, mass or the like, the velocity or the acceleration at the time of stop at each observation point shown in FIGS. 6a to 6c in each drive should be the same in the registration and the time lapse operation, so that the tooth of the gear or the axis of the gear at the time of stop at each observation point is in the approximately same state in the registration and the time lapse operation.

Figure 6D:
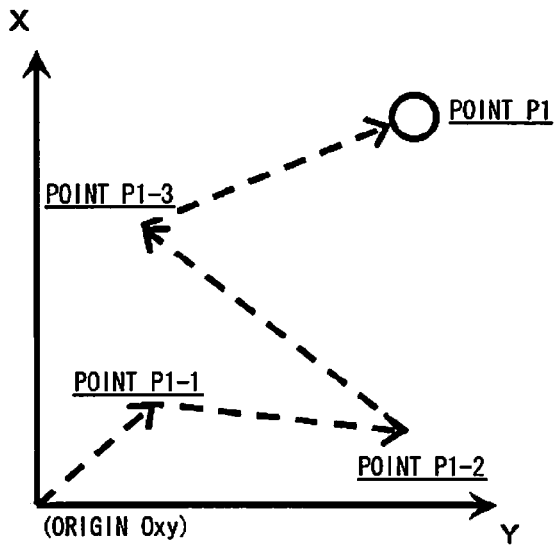

FIG. 6d shows a path on which the operator moves the stage 101 to search the "predetermined position" desired by the operator described above while observing before the registration of the point P1. Here, after driving the stage 101 to a point P1-1, the operator determines whether to register a cell existing at the point P1-1. The operator does not wish to register the cell at the point P1-1, and therefore, the stage 101 is driven to a next point P1-2, and then the operator determines whether to register a cell existing at the point P1-2. The operator does not wish to register the cell at the point P1-2, and therefore, the stage 101 is driven to a next point P1-3, and then the operator determines whether to register a cell existing at the point P1-3. The operator does not wish to register the cell at the point P1-3, and therefore, the stage 101 is driven to a next point P1, and then the operator determines whether to register a cell existing at the point P1. The operator wishes to register the cell existing at the point P1, and therefore, the point P1 is registered. The registration is realized by inputting by pressing a button for registration (a keyboard or a click button of a mouse) which is not shown. Thus, although the drive of the stage 101 is stopped at the points P1-1, P1-2, and P1-3, since the operator does not depress the button for registration, the points P1-1, P1-2, and P1-3 are not registered. Accordingly, the stop process mode is not executed at the points P1-1, P1-2, and P1-3 in the time lapse operation.

In this embodiment, in the case where the point P1 is registered after following such a path as shown in FIG. 6d, the stage 101 directly moves to the point P1 in the time lapse operation so that the observation can be performed at the point P1 as shown in FIGS. 6b and 6c without following the same path shown in FIG. 6d before reaching the point P1. Conventionally, in the case where the point P1 is registered after following such a path as shown in FIG. 6d, it is necessary to follow the same path shown in FIG. 6d in the time lapse operation so as not to generate a difference in the paths to reach the point P1 between in the registration and in the time lapse operation and error in the stop position due to the influence of the twisting, distortion, or the like in the drive system which is different between in the registration and in the time lapse operation (even if it is not necessary to follow the same path shown in FIG. 6d so as to handle the stop position error due to the backlash). Unlike the conventional art, in the present application, even in the case where the same path is not followed in the registration and in the time lapse operation, the twisting, distortion, or the like in the drive system can be equalized in the registration and in the time lapse operation by performing the compensation control operation. Thus, the position error in the stop position can be handled, i.e. the error can be improved.

Here, back to FIGS. 5c and 5d, improvement of the position error in the stop position in this embodiment is explained.

The pattern diagram shown in FIG. 5c and the table shown in FIG. 5d are taken here for example. Note that in FIG. 5c, the output side gear 600out shown in FIG. 5a is omitted.

In the case where the input side gear 600in is stopped after rotating in the CCW direction (the stop here is hereinafter referred to as a "temporary stop") and the driving direction thereafter (i.e. next driving direction) is the CW direction, the input side gear 600in is further rotated in the CCW direction at the time of the temporary stop (this further rotation is hereinafter referred to as a first drive to move the stage in the predetermined direction), and thereafter, the input side gear 600in is rotated in the CW direction (this rotation is hereinafter referred to as a second drive to move the stage in a direction opposite to the predetermined direction), then final stop is performed. It should be appreciated that the position where the input side gear 600in is stopped is a "predetermined stop position" stored in the memory desired by the operator.

Further, in the case where the input side gear 600in is stopped after rotating in the CW direction (the "temporary stop" mentioned above) and the driving direction thereafter (i.e. next driving direction) is the CW direction, the input side gear 600in is rotated once in the CCW direction at the time of the temporary stop (the first drive to move the stage in the predetermined direction), and thereafter, the input side gear 600in is rotated in the CW direction (the second drive to move the stage in a direction opposite to the predetermined direction), then the final stop is performed. The position where the input side gear 600in is stopped is the predetermined stop position.

As shown in the table in FIG. 5d, "the rotation in the CCW direction and the rotation in the CW direction thereafter in the stop process mode" described above is performed not only in case where the next driving direction is the CW direction as described above, but also in the case where the next driving direction is the CCW direction.

The first drive and the second drive are not limited to the rotation in the CCW direction and the rotation in the CW direction thereafter described above.

Figure 7A:
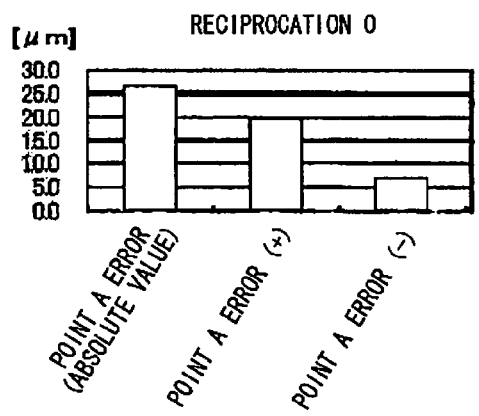
FIGS. 7a to 7d are views for explaining assessment of an error in a stop position according to the embodiment.
Figure 7B:
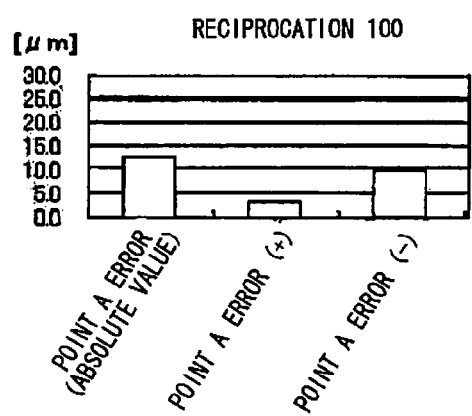
Figure 7C:
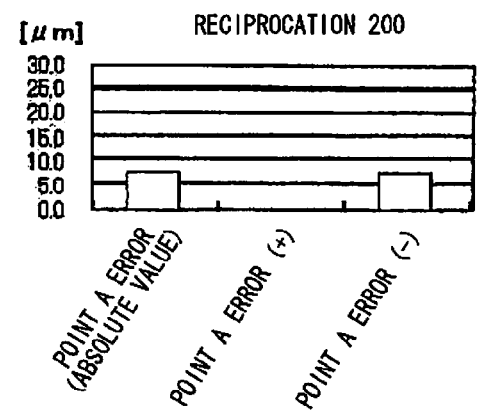
Figure 7D:
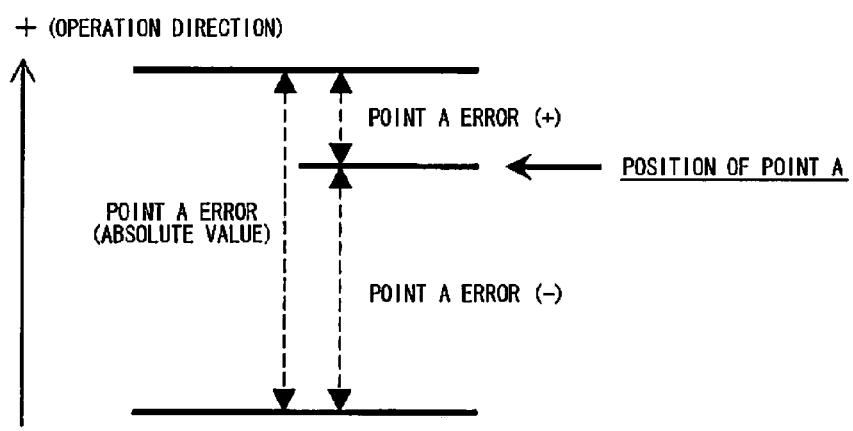

FIGS. 7a to 7c show data for evaluating the stop position error (the unit is μm) comparing the case where the compensation control is not performed at the time of the stage driving (FIG. 7a) and the case where the compensation control is performed at the time of the stage driving (FIGS. 7b and 7c). The first drive and the second drive are performed for 100 pulses in FIG. 7b, while the first drive and the second drive are performed for 200 pulses in FIG. 7c (2 μm per pulse outputted by the pulse generator described above). A point A error shown in FIGS. 7a to 7c is an error (displacement) with respect to a position of a point A shown in FIG. 7d (a method of selecting the point A is to be described later). A point A error (+) is an error with respect to the position of the point A in a positive direction (an operation direction of the second drive) shown in FIG. 7d, and a point A error (−) is an error with respect to the position of the point A in a negative direction shown in FIG. 7d. Also, a point A error (absolute value) is a total value of the point A error (+) and the point A error (−). The point A error (−) is a value having an opposite (inverse) polarity to the point A error (+). Here, the driving parameter is a parameter which can move a drive source, which is the pulse motor in this case, in order to realize operating characteristics shown in FIG. 8 to be described later. The driving parameter is acceleration condition or a function of time, velocity, distance and the like as an alternative to the acceleration condition.

An experiment for evaluation of FIGS. 7a to 7c was executed by repeating the procedure of 1 to 3 described below.

1. First, the observation point is moved to an origin Oxy (hereinafter referred to as an origin return operation); 2. the observation point is moved toward the point A and the compensation control is performed (the compensation control is not performed in FIG. 7a); and 3. the cell is imaged and the picture thereby obtained is saved.

In each case of FIGS. 7a to 7c, the operation described above in 1 to 3 is repeated 100 times. The point A error (+) is the largest value obtained in 100 times and the point A error (−) is the smallest value obtained in 100 times. The point A error (+) and the point A error (−) are calculated by selecting a reference cell from a first picture imaged in 3 mentioned above (selection of the point A) and then measuring a position displacement of the cell in a 2nd to 100th pictures on a monitor screen or the like with reference to a position of the reference cell. The reference cell is selected from the first imaged picture because the first picture can be considered to be corresponding to the operation in the registration to the time lapse operation. In particular, the value of the displacement is detected in the number of pixels in a picture data of the imaged picture. Here, in the first picture, a cell having a clear outline is to be picked.

In FIG. 7*b*, the point A error (absolute value) is not more than a half of that in the case where the compensation control is not performed (FIG. 7*a*), while, in FIG. 7*c*, the point A error (absolute value) is nearly one fourth of that in the case where the compensation control is not performed (FIG. 7*a*). This shows that the position error is improved.

Thus, the position error is improved by the drive in the compensation control, and it seems this is because the position error due to stiffness, mass or the like is handled. In other words, this is because by performing the compensation control, variation of the velocity and acceleration is common in each drive and the twisting, distortion, expansion and contraction or the like in the drive system is common in each drive.

Figure 8:
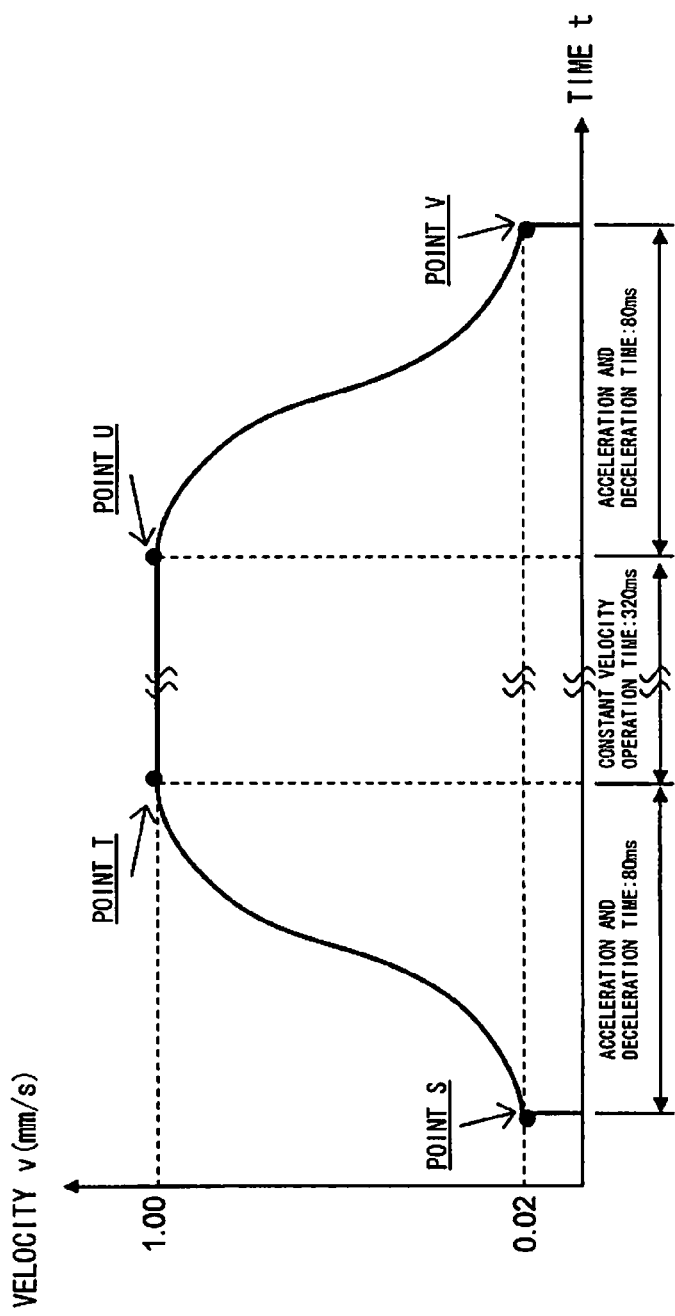
FIG. 8 is a characteristic view regarding a velocity of a stage according to the embodiment.

The compensation control in this embodiment is controlled based on the driving parameter set in the control part 301. FIG. 8 shows characteristics regarding the velocity of the stage in the driving parameter. That is, the stage 101 started moving at an initial velocity of 0.02 mm/s and then accelerated (from point S to point T). Thereafter, when the velocity reaches a final velocity of 1 mm/s after 80 msec, the stage 101 is moved at a constant velocity (from point T to point U). After moved at the constant velocity for 320 msec, the stage 101 is decelerated (from point U to point V). Then, when the velocity reaches 0.02 mm/s after 80 msec, the operation stops. The time required for the operation described above is 480 msec (the movement distance is 0.4 mm). The characteristics of acceleration and deceleration are acceleration and deceleration in an S shape.

Even if there is no such a section as from the point T to the point U shown in FIG. 8, by performing each time the compensation control including at least sections from the point S to the point T, and from the point U to the point V as movement for the observation, the "position error due to stiffness, mass or the like" can be handled. This is because if all of the at least the sections from the point S to the point T, and from the point U to the point V in each drive are not included, it is not possible to unify the velocity and acceleration in each drive. Therefore, it is necessary that the movement distance in the first drive and the second drive in the compensation control is a value (limit distance) including at least the sections from the point S to the point T, and from the point U to the point V. Regardless of magnitude relation between the limit distance and the movement distance in the stage driving, the movement distance in the first drive and the second drive is the limit distance or longer. Whether the length of the movement distance in the compensation control is large or small is determined in accordance with whether the length of the section from the point T to the point U is large or small, with the limit distance described above being the smallest value.

The driving parameter includes, as well as the velocity of the stage described above, a parameter associated with the position or drive of the stage, such as the acceleration of the stage, the position of the stage (x-y coordinate), an external force applied to the stage, a kinetic energy of the stage, a rotation velocity or a rotation acceleration of a gear or a pulley used in the x-axis driving section 103 and the y-axis driving section 104, torque of the gear or the pulley, and the like. The driving parameter in the motor driving which realizes the characteristics includes the number of drive pulses in the stepping motor, a movement distance per pulse (μm), a change ratio of increase and decrease in the number of pulses, and the like. FIG. 8 shows an example in which, during the stage driving in the sections from the point S to the point T, and from the point U to the point V, the stage is controlled so that the way of acceleration and the way of deceleration are the same, i.e. the lines indicating the velocity is line-symmetric in the figure.

The operation shown in FIG. 8 is performed both in the first drive and in the second drive described above. It should be appreciated that the drive directions thereof are opposite to each other in the first drive and the second drive.

The driving parameter in the first drive (hereinafter referred to as a first driving parameter) and the driving parameter in the second drive (hereinafter referred to as a second driving parameter) does not necessarily have to be the same, but it is only necessary that each of the first driving parameter is the same and each of the second driving parameter is the same in each drive in a registration operation (a first aspect operation) to be described later and each time lapse operation (a second aspect operation corresponding to the first aspect operation). This is because handling the "position error due to stiffness, mass or the like" by performing the compensation control is a method of cancelling almost all (relative) displacement of the position of the stage among drives, at least by equalizing the position errors described above in the first drive in each drive in the registration operation and the time lapse operation, and equalizing the position errors described above in the second drive in each drive, even if the stop position in each drive in the registration operation and the time lapse operation includes an error in an absolute positional relation. In other words, this is because the position error in a relative positional relation of the stage can be handled by this method. Here, handling the position error is to make the displacement of the position within a predetermined range at each stop position, i.e. to suppress a difference in a coordinate value indicating the position (the position error) to within a predetermined value. The predetermined value is set to a value such that the position error is within an acceptable range in the observation and imaging in the time lapse operation.

Although the above description said that it is only necessary that each of the first driving parameter is the same and each of the second driving parameter is the same, in view of the fact that it is only necessary that twisting, distortion, expansion and contraction or the like which has been generated in the drive system is cancelled in the first drive and the twisting, distortion, expansion and contraction or the like in the drive system is equalized in the second drive, it is only necessary that each of the second driving parameter is the same.

The operation explained with reference to FIG. 8 is performed in both the CCW direction and the CW direction thereafter shown in FIGS. 5*c* and 5*d*. In case where FIG. 8 shows a characteristics chart of the control in the CW direction, as a characteristics chart of the control in the CCW direction, is used a characteristics chart of the control which the direction of a velocity is opposite to that shown in FIG. 8.

According to FIG. 8, in the compensation control, the stage is controlled to move in the predetermined direction by 400

μm by the rotation in the CCW direction for 480 msec (the first drive), and then controlled to move in the direction opposite to the predetermined direction by 400 μm by the rotation in the CW direction for 480 msec (the second drive).

Thus, the operation in the stop process mode is a constant operation (rotation in the CCW direction and thereafter the rotation in the CW direction) regardless of the rotation direction of the gear in the next operation. Therefore, it is not necessary to store the rotation direction of the input side gear 600in (or the output side gear 600out) at the time of stop, i.e. to store the operation direction of the stage at the time of stop for each stop position as in the conventional way.

By performing the compensation control in this embodiment, not only the position error of the observation object due to the backlash but also the "position error due to stiffness, mass or the like" can be handled.

(X-Axis Driving Section and Y-Axis Driving Section)

Transmission of the torque between the input side gear 600in and the output side gear 600out in the CW direction or the CCW direction enables the movement of the stage 101 in a predetermined single direction or a direction opposite to the predetermined single direction. However, since in an actual observation device or observation system, the contained cell (observation object) is searched and observed within a flask (the fluid vessel 102), it is necessary that the flask, namely the stage, can be moved in an arbitrary direction in a plane. Therefore, in the observation device 4000 and the observation system 5000 in this embodiment, provided are the x-axis driving section 103 which is a driving part driving the stage 101 to move in the x-axis direction and the y-axis driving section 104 which is a driving part driving the stage 101 to move in the y-axis direction perpendicular to the x-axis direction.

In this embodiment, the x-axis driving section 103 manages the movement of the stage 101 in the x-axis direction and the y-axis driving section 104 manages the movement of the x-axis driving section 103 and the stage 101 in the y-axis direction. In other words, the y-axis driving section 104 moves the stage 101 integrally with the x-axis driving section 103 in the y-axis direction. This is explained below with reference to FIG. 9.

Figure 9:
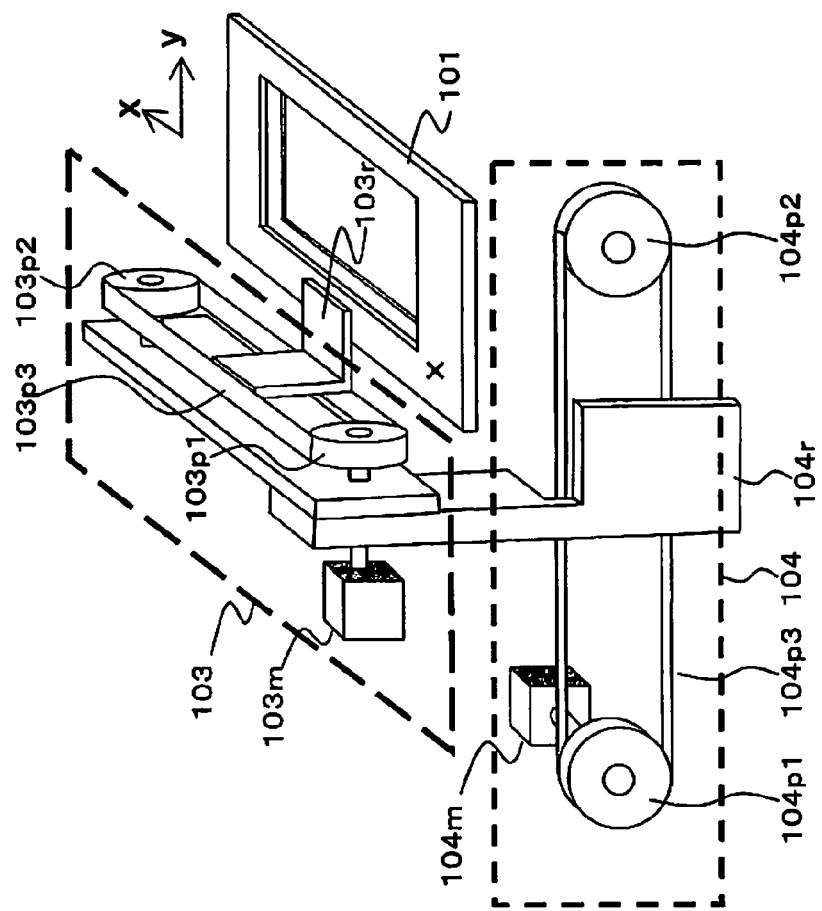
FIG. 9 is a perspective view of an x-y plane driving mechanism according to the embodiment.

FIG. 9 is a perspective view showing an example of a mechanism (hereinafter referred to as an x-y plane drive mechanism) in which the x-axis driving section 103 manages the movement of the stage 101 in the x-axis direction and the y-axis driving section 104 manages the movement of the x-axis driving section 103 and the stage 101 in the y-axis direction. FIG. 9 only shows a part of the mechanism managing the movement of the stage 101 in the x-axis direction and the y-axis direction.

The x-axis driving section 103 comprises: a drive source 103*m* (hereinafter referred to simply as stepping motor) including the stepping motor, the input side gear 600in and the output side gear 600out described above and the like; a belt 103*p*3; and pulleys 103*p*1, 103*p*2 arranged at both ends of the belt 103*p*3. The pulley 103*p*1 is attached to a rotor part of the stepping motor 103*m*.

The stage 101 is attached to the belt 103*p*3 by an arm 103*r*. The stage 101 moves in a positive direction and negative direction of the x-axis when the stepping motor 103*m* drives the pulleys 103*p*1, 103*p*2 to rotate, thereby moving the belt 103*p*3. The drive of stepping motor 103*m* is subjected to the control by the control device 300, such as rotation control, stop control, the compensation control described above, and the like.

The y-axis driving section 104 comprises: a drive source 104*m* (hereinafter referred to simply as stepping motor) including the stepping motor, the input side gear 600in and the output side gear 600out described with reference to FIG. 5*a*; a belt 104*p*3 and the like; and pulleys 104*p*1, 104*p*2 arranged at both ends of the belt 104*p*3. The pulley 104*p*1 is attached to a rotor part of the stepping motor 104*m*.

The x-axis driving section 103 and the stage 101 attached to the x-axis driving section 103 are attached to the belt 104*p*3 by an arm 104*r*. The stage 101 and the x-axis driving section 103 move in a positive direction and negative direction of the y-axis when the stepping motor 104*m* drives the pulleys 104*p*1, 104*p*2 to rotate, thereby moving the belt 104*p*3. The drive of stepping motor 104*m* is subjected to the control by the control device 300, such as rotation control, stop control, the compensation control described above, and the like.

With a configuration described above, the x-y plane drive mechanism can move the stage 101 in an arbitrary direction in the x-y plane.

In the x-y plane drive mechanism shown in FIG. 9, the drive in the x-axis direction and the drive in the y-axis direction are performed independently. In the case where only the drive in the y-axis direction is performed without performing the drive in the x-axis direction, generated is twisting or distortion on a rotation axis part or a tooth part of the gear, slip of the belt on a surface of the pulley, expansion and contraction of the belt, or the like in the gear, pulley, belt and the like of the x-axis driving section 103. In other words, even if the x-y plane drive mechanism is in a stop state in the x-axis direction, the drive in the y-axis direction influences the x-axis driving section 103 to generate the twisting, distortion or the like in the gear, pulley, or belt of the x-axis driving section 103. As a result, even if the x-y plane drive mechanism is in a stop state in the x-axis direction, generated are the twisting, distortion or the like of those elements, the displacement of the stop position due to the twisting, distortion or the like, and further, the lost motion depending thereon. In view of this, in the x-y plane drive mechanism in this embodiment, the compensation control is performed both in the driving parts of the x-axis and the y-axis even in the case where the coordinate of one of the axes is the same before and after the movement of the stage and the coordinate of the other of the axes is different between before and after the movement of the stage. In other words, the compensation controls in the driving parts of x-axis and the y-axis are performed in synchronization with each other (i.e. at the same time). The compensation controls described above are hereinafter referred to as synchronous compensation controls in the x-y drives.

Figure 10:
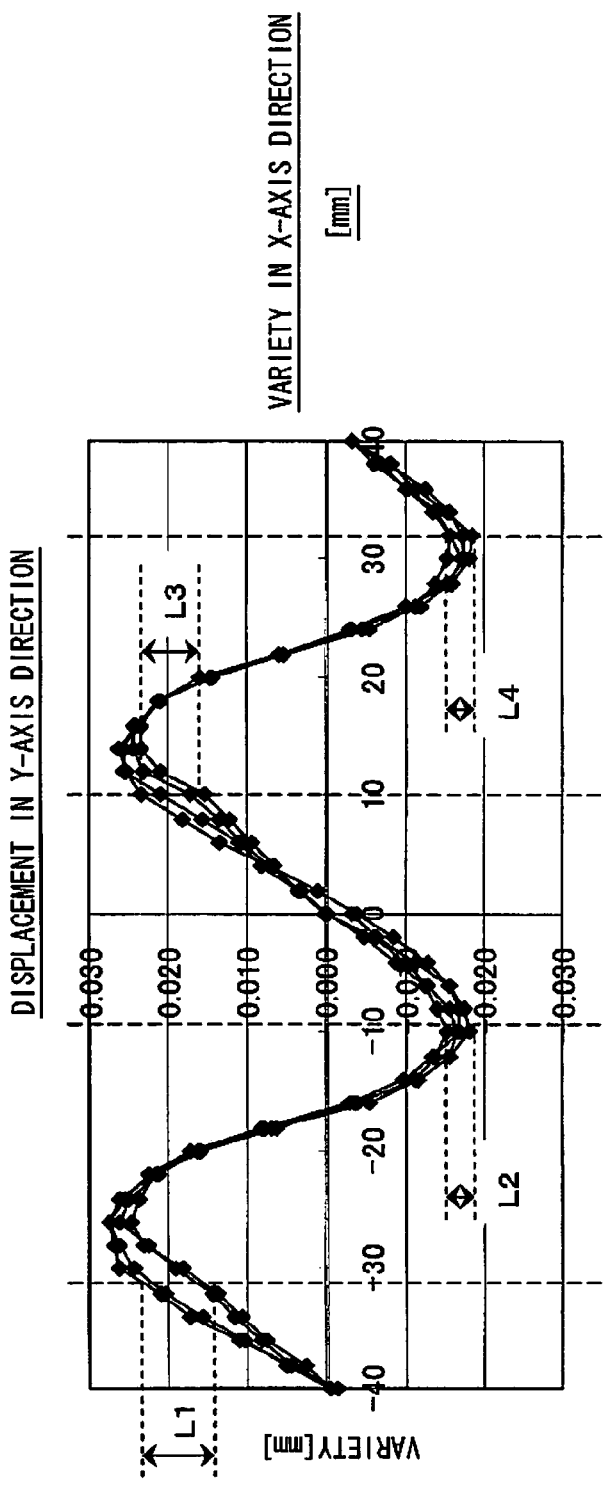
FIG. 10 is a view showing a displacement in a y-axis direction according to the embodiment.

FIG. 10 shows whether or not the position displacement in the y-axis direction occurs in the case where only the drive in the x-axis direction is performed without performing the drive in the y-axis direction. This figure shows measurement results of the position displacement generated in the y-axis direction after performing the drive in the x-axis direction by −40 mm to +40 mm in the x-axis direction without performing the drive in the y-axis direction. A horizontal axis is the driving distance in the x-axis direction and a vertical axis is the measured value of the displacement in the y-axis direction.

As shown in FIG. 10, even in the case where the drive in the y-axis direction is not performed, the displacement in the y-axis direction is generated when the drive in the x-axis direction is performed (see parts L1, L2, L3, and L4 of characteristic difference in FIG. 10). Therefore, even in the case where only the drive in the x-axis direction is performed, it is necessary to perform the compensation control operation in the y-axis direction as well. By performing the compensation control operation in the y-axis direction as well, the characteristic differences L1, L2, L3, and L4 among the drives shown in FIG. 10 are cancelled, and the displacement characteristic in each drive becomes the same to cancel the relative position error among the drives.

Next, the synchronous compensation controls in the x-y drives is explained with reference to FIGS. 11a to 11c.

Figure 11A:
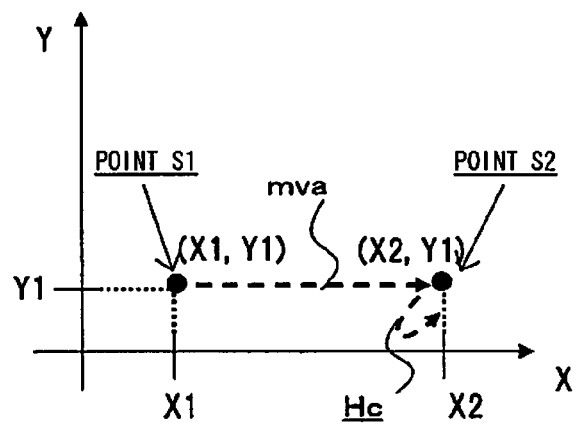
FIGS. 11a to 11c are views for explaining a synchronous compensation control regarding an x-y driving according to the embodiment.

FIG. 11a shows an example in which the origin Oxy of the stage (a point indicated by an x mark in FIGS. 1 and 9) is moved from a point S1 to a point S2. The figure shows a movement mva in which the y-coordinate is Y1, which is the same before and after the movement, and the x-coordinate changes from X1 to X2. Here, the drive Hc by the compensation control (hereinafter referred to as compensation control drive) is performed not only in the x-axis direction but also in the y-axis direction at the same time.

Figure 11B:
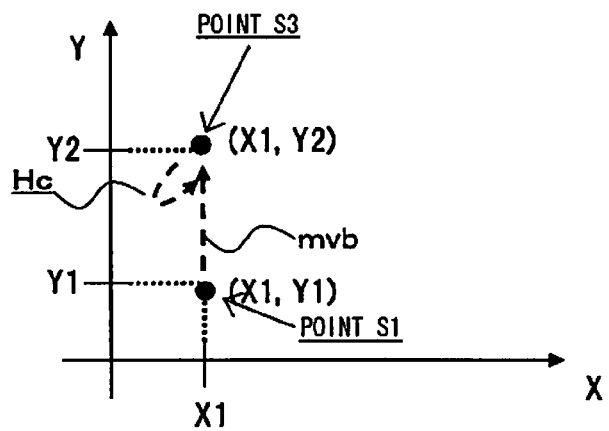

FIG. 11b shows an example in which the origin Oxy of the stage is moved from the point S1 to a point S3. The figure shows a movement mvb in which the x-coordinate is X1, which is the same before and after the movement, and the y-coordinate changes from Y1 to Y2. Here, the compensation control drive Hc is performed not only in the y-axis direction but also in the x-axis direction.

Figure 11C:
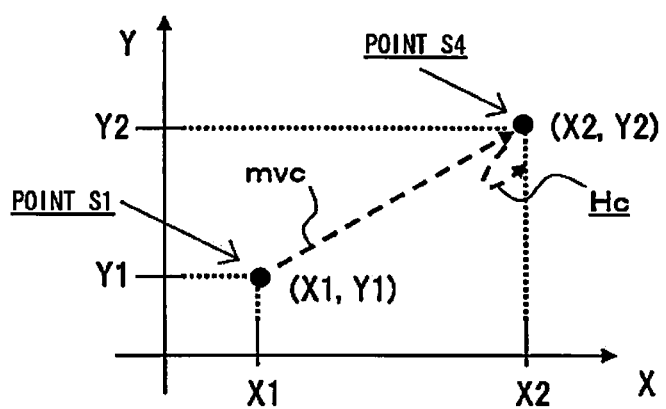

FIG. 11c shows an example in which the origin Oxy of the stage is moved from the point S1 to a point S4. The figure shows a movement mvc in which the x-coordinate changes from X1 to X2, and the y-coordinate changes from Y1 to Y2. Here, the compensation control drive Hc is performed both in the y-axis direction and the x-axis direction.

In FIGS. 11a to 11c, all the compensation control drives Hc are the same. In the case where the driving parameter is the same in the drive in the x-axis direction and in the drive in the y-axis direction, the movement direction of the compensation control drive Hc is an angle of 45 degrees with respect to the x-axis and the y-axis.

Although the compensation control operation is indicated only once in FIGS. 11a to 11c, the compensation control operation may be performed more than once.

Thus, even in the case where only the drive in one axis direction is performed without the movement in the other axis direction and twisting or distortion on a rotation axis part or a tooth part of the gear, slip of the belt on a surface of the pulley, expansion and contraction of the belt, or the like is generated in the drive system such as the gear, pulley, belt, or the like in the other axis direction by the influence of the drive in the one axis direction, it is possible to handle the "position error due to stiffness, mass or the like" which depends on those.

In the observation device 4000 and the observation system 5000 in this embodiment, the compensation control is performed at the time of registration (registration of the position of the stage) of the position of the observation object which is to be automatically observed and imaged by the time lapse operation, and is performed also at the time of actual automatic imaging of the observation object in the time lapse operation. It is thereby possible to equalize the position error at the time of registration and the position error at the time of the actual time lapse operation. Here, the registration is to store position information or the like in the memory, and the registration of the position is to store the predetermined position of the stage 101 (x-y coordinate or the like) in the memory 304. The predetermined position is, for example, the "position desired by the operator" mentioned above. Here, all the driving parameter is the same in the compensation control at the time of registration and in the compensation control at the time of the actual time lapse operation.

The time lapse operation corresponds to the operation of the registration of the position described above since in the time lapse operation, the stage 101 is moved to each registered position and the observation and imaging are performed at each position as already described above. When the operation of the registration of the position is the first aspect operation, the second aspect operation corresponding to the first aspect operation is each time lapse operation. In each time lapse operation which is the second aspect operation, performed is the stage drive to move the stage 101 to the predetermined position described above stored in the memory 304.

Figure 14:
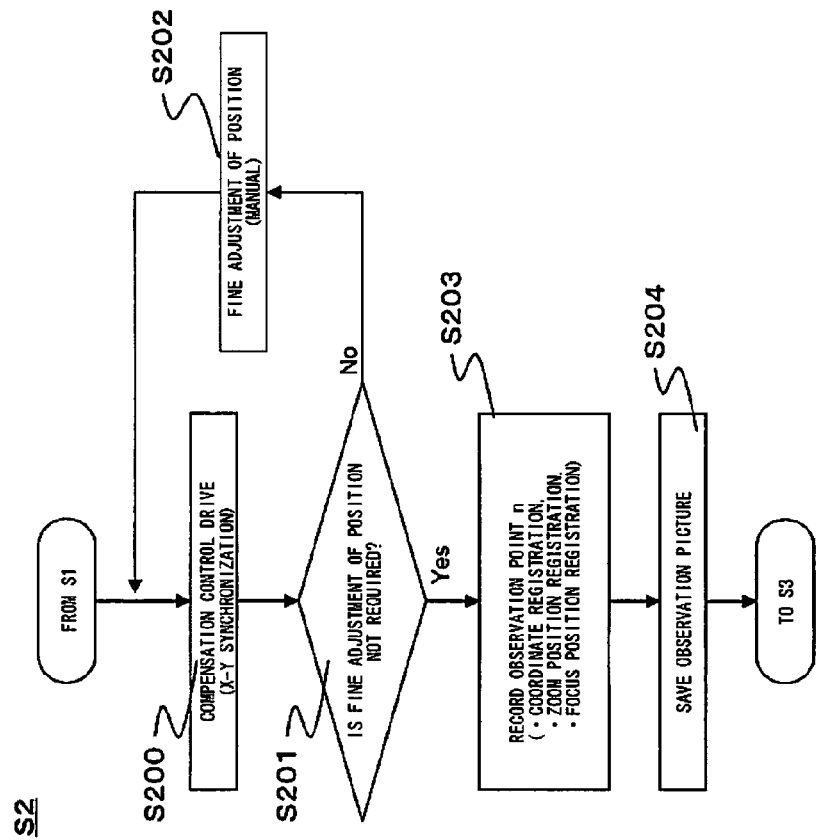
FIG. 14 is a flow diagram of the observation and imaging operation according to the embodiment.
Figure 15:
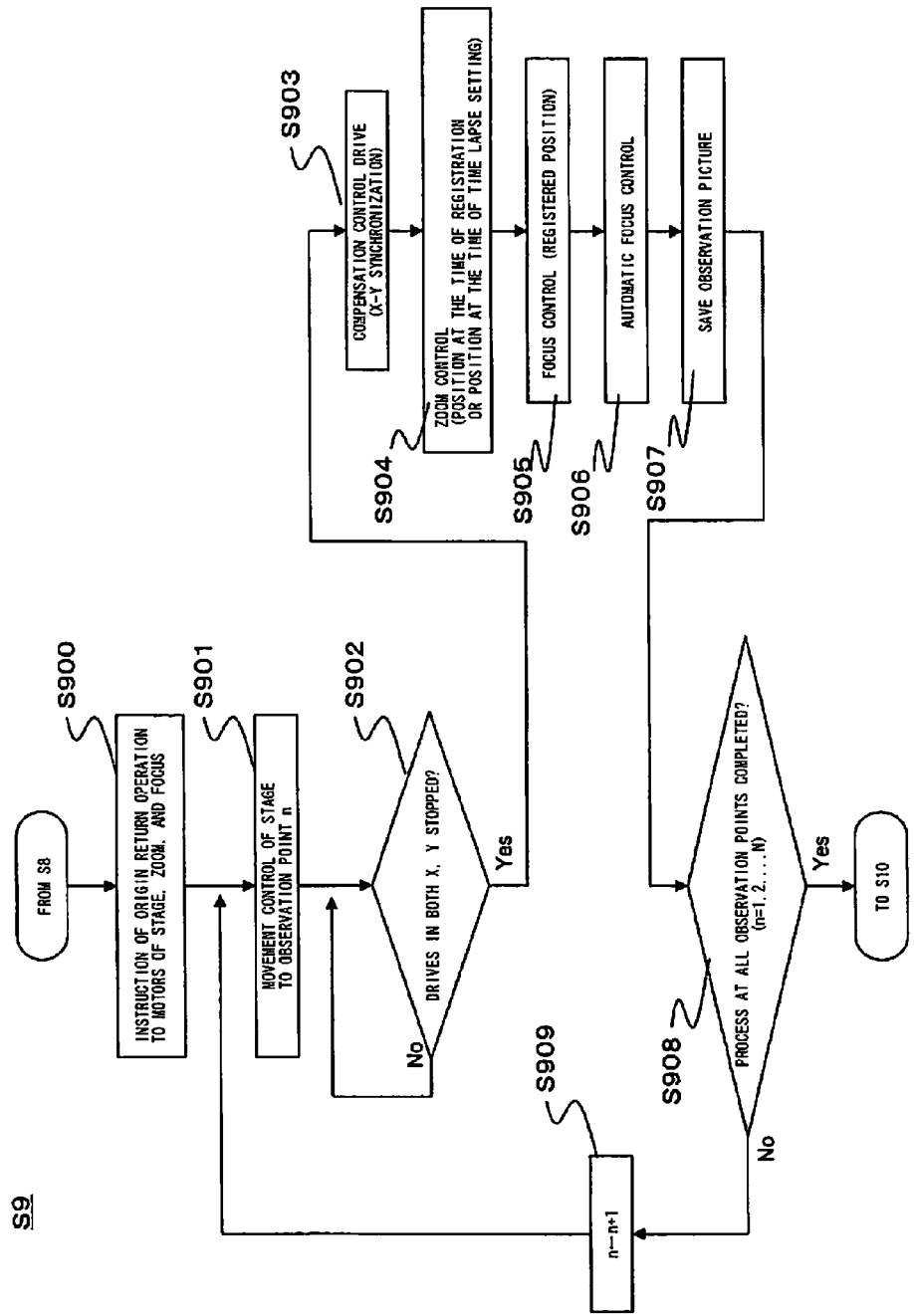
FIG. 15 is a flow diagram of the observation and imaging operation according to the embodiment.

A series of operations including the compensation control described above by the control device 300 (more specifically, the control part 301 and the compensation control part 302) in the observation device 4000 (or the observation system 5000) in this embodiment is explained below in the description of the observation and imaging work by using a flow chart of the observation and imaging work shown in FIGS. 13 to 15. These operations are executed mainly by execution of a control program in a CPU. In the flow chart, the observation and imaging work is focused and other work is omitted.

[Embodiment]

The operation condition (driving parameter) in the compensation control in this flow is the same as that described with reference to FIG. 8, where acceleration (deceleration) of between 0.02 mm/s and 1 mm/s is performed for 80 msec, and operation at a constant velocity is performed for 20 msec. The movement distance for that period is 0.4 mm (200 pulses). The time interval of the time lapse operation is one hour, and an upper limit of the number of observation points is 9 in view of heat generation and the like.

Figure 12A:
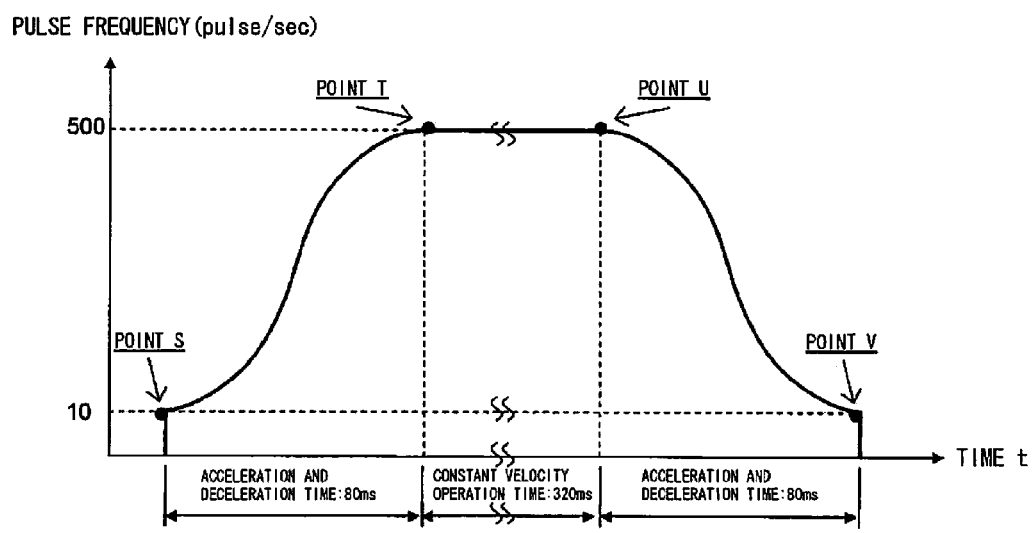
FIGS. 12a to 12c are views for explaining characteristics of a motor driving parameter according to the embodiment.
Figure 12B:
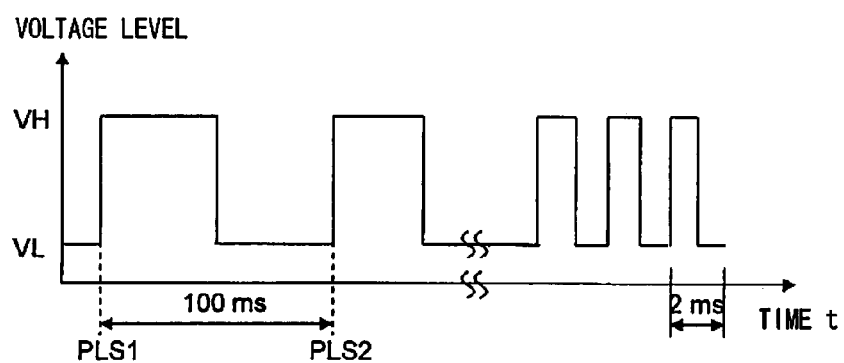
Figure 12C:
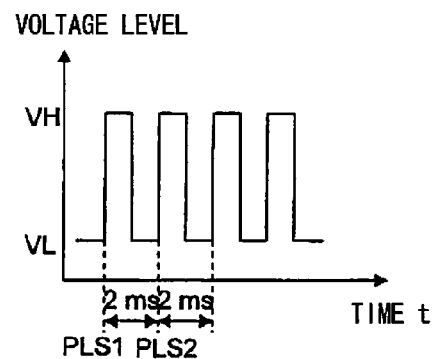

In this flow, in the case where the operation condition described above is set in a command register of the pulse generator described above, it is not necessary to set pulse information such as pulse frequency or the like with respect to a time axis direction in the pulse generator. That is, in the case where the driving parameter regarding the velocity and acceleration of the stage is set in the pulse generator, the driving parameter is converted into the pulse information in the pulse generator. A function Fc representing the driving parameter is "stepping motor driving parameter (pulse frequency or the like)=Fc (initial velocity, final velocity, acceleration and deceleration characteristics, acceleration time, deceleration time, constant velocity time)", where argument is the initial velocity, final velocity, acceleration and deceleration characteristics, acceleration time, deceleration time, and constant velocity time. The driving parameter is supplied to the pulse generator, and thereby pulse characteristics shown in FIGS. 12a to 12c are obtained. And this pulse is supplied to a pulse motor, and thereby the drive of the stage as shown in FIG. 8 is realized.

Pulse waveform shown in FIGS. 12a to 12c is described in detail below. These figures show pulse frequency [the number of pulses/sec] characteristics with respect to the time axis. According to FIG. 12a, the acceleration is performed from a frequency of 10 pulses/sec (from point S to point T). And then, when the frequency reaches 500 pulses/sec, the operation is performed at a constant velocity (from point T to point U). After the operation is performed at the constant velocity for 320 msec, the deceleration is performed (from point U to point V). And then, when the frequency reaches 10 pulses/sec after msec, the operation stops. The time required for the operation described above is 480 msec (the movement distance is 0.4 mm). The characteristics of acceleration and deceleration of the pulse frequency are acceleration and deceleration in an S shape.

FIG. 12b shows a pulse waveform at the time of the acceleration and deceleration of the pulse frequency from the point S to the point T. A pulse signal is switched between a voltage level VH and a voltage level VL. A length between the time of shift from the voltage level VL to the voltage level VH (point PLS1 in FIG. 12b) and the time, immediately thereafter, of the shift from the voltage level VL to the voltage level VH (point PLS2 in FIG. 12b) is one wavelength, a cycle of which determines the pulse frequency. In FIG. 12b, the pulse frequency is increased as time elapses. In other words, the cycle of the pulse is shortened from 100 ms to 2 ms as time elapses, along an S-shaped curve shown in FIG. 12a. The pulse waveform at the time of acceleration and deceleration of the pulse frequency from the point U to the point V is opposite thereto (i.e. the cycle of the pulse changes from 2 ms to 100 ms).

FIG. 12c shows a pulse waveform at the time of the operation at the constant velocity from the point T to the point U. The pulse signal is switched between the voltage level VH and the voltage level VL, and the cycle is constant at 2 ms.

Figure 13:
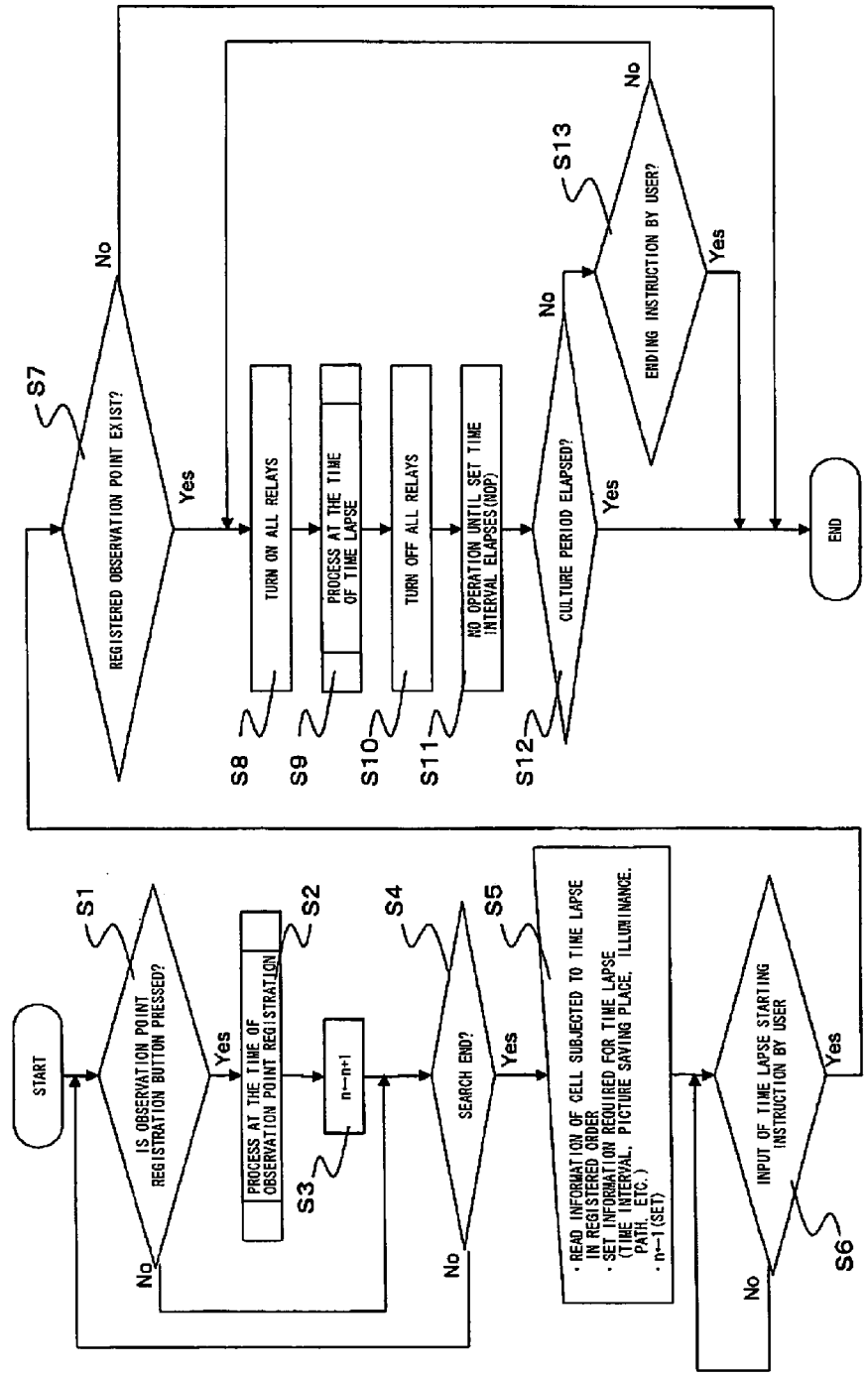
FIG. 13 is a flow diagram of an observation and imaging operation according to the embodiment.

In FIG. 13, the work state moves to step S1 when the observation and imaging work is started. At the time of starting the observation and imaging work, an initialization process is performed in the observation device 4000 (or the observation system 5000). In the example described below, the initialization process is performed in the observation device 4000. For example, a count variable n is set to an initial value zero (reset). The count variable n is used for counting the number of registrations of the observation point. When the number of observation points registered in this flow, i.e. the number of cells to be observed and imaged, is N, a range of n is $0 \leq n \leq N$.

In step S1, it is determined whether or not an observation point registration button which is not shown in the figure has been pressed by the operator of the observation device 4000. The observation point registration button is pressed in the case where the operator finds the cell which he or she wishes to observe during the search of the cell. The pressing of the observation point registration button indicates that the cell which the operator wishes to observe is selected by the operator. The position registered here is the "position desired by the operator". If the observation registration button is pressed by the operator, the flow proceeds to step S2, while if the observation point registration button is not pressed by the operator, the flow proceeds to step S4.

In step S2, the registration of the cell selected by the operator, i.e. the registration of the observation point, is performed. Details of the registration are to be described later with reference to FIG. 14.

In step S3, the variable n is incremented since the observation point is registered.

In step S4, it is determined whether or not the operator ends the search of the observation point, i.e. whether or not there are no more cells which the operator wishes to observe. If the operator ends the search, the flow proceeds to step S5, while if the operator does not end the search, the flow returns to step S1.

Steps S1 to S4 described above are a registration flow of the observation point. Step S5 and subsequent steps are a flow operation of the automatic time lapse operation.

In step S5, the registered cell information, i.e. the information of the observation point, is read from the memory 304 in the registered order. Also, calculation or setting of the information for executing the time lapse operation is performed based on the information or by input by the operator at an arbitrary timing. For example, automatically performed is the calculation or setting of the time interval of the time lapse operation, the registered position of the imaging picture, the movement path between the observation points, the upper limit of the number of registrations calculated from the time interval described above (i.e. the upper limit of the number of observation points) or the like. The upper limit of the number of observation points needs to be calculated because the temperature influence to the observation object due to heat generation is unignorable when the observation involves much drive operation. Further, one is inputted to the variable n.

In step S6, it is determined whether or not the operator has instructed to start the time lapse operation. If the operator has instructed to start the time lapse operation, the flow proceeds to step S7, while if the operator has not instructed to start the time lapse operation, the input is waited in step S6.

Steps S7 to S13 are actual automatic time lapse flow. In this flow, the time interval of the time lapse operation is set to one hour, and a culture period is 30 days. Also, the time required for the time lapse operation of N observation points is less than one hour.

In step S7, it is determined whether or not the operator has registered an observation point. In other words, it is determined whether or not n is greater than zero. If n is greater than zero, the flow proceeds to step S8, while if n is zero, all the flow operation ends.

In step S8, in the motor control part 202, all relay switches of the stepping motor and the like are turned ON.

In step S9, the time lapse operation is performed. Details of the operation are to be described later with reference to FIG. 15.

In step S10, in the motor control part 202, all the relay switches of the stepping motor and the like are turned OFF. Here, every time the time lapse operation is performed in step S9, the relay switches are turned ON in step S8 and the relay switches are turned OFF in step S10, because if the electric power is kept supplied to the stepping motor and the like, the electric power is consumed even when the stepping motor and the like is not operated. Therefore, in view of electric power saving or the temperature influence to the observation object due to the heat generation, the electric power is supplied every time the stepping motor and the like is used, and the power supply is stopped when the usage is not required.

In step S11, no operation is performed until the time interval has elapsed. Here, the observation device 4000 does not perform with regard to the time lapse operation in this flow. However, the observation device 4000 performs, for example, timer operation with regard to the operation other than the time lapse operation.

In step S12, it is determined whether or not the culture period has elapsed. If the culture period has not elapsed, the flow proceeds to step S13, while if the culture period has elapsed, all the flow operation ends.

In step S13, if the operator has instructed to end the time lapse operation, all the flow operation ends, while if the operator has not instructed to end the time lapse operation, the flow returns to step S8 because the time lapse operation needs to be kept performed during the culture period.

The process (step S2) performed during the registration of the observation point n is explained below with reference to FIG. 14. In this process, the state proceeds from step S1 to step S200.

In step S200, the drive by the compensation control described above is performed by the x-axis driving section 103 and the y-axis driving section 104. The compensation control drives by the x-axis driving section 103 and the y-axis driving section 104 are performed in synchronization with each other as described above with reference to FIGS. 11a to 11c.

In step S201, it is determined whether or not fine adjustment is required in the position (coordinate) of the observation point which the operator wishes to register. This fine adjustment is required to compensate in the case where the position of the observation point is slightly displaced. If the fine adjustment is required, the flow proceeds to step S202, while if the fine adjustment is not required, the flow proceeds to step S203.

In step S202, the fine adjustment of the position (coordinate) of the observation point which the operator wishes to register is performed by manual operation of the operator.

In step S203, the information regarding the observation point n is stored in the memory 304. In other words, stored are the position (coordinate or the like) of the observation point n, a zoom value or a focus value at the time of the observation of the cell at the observation point and the like. Here, although the focus value is not necessarily stored in the case where the microscope section 107 has an automatic focus function, the focus value is stored in this flow.

In step S204, a figure or an enlarged view of a cell existing at or around the observation point is imaged, and the imaged picture is stored in the memory 304. The picture imaged here is a picture showing the initial state of the cell culture.

The process of the time lapse operation (step S9) is explained below with reference to FIG. 15. In this process, the state proceeds from step S8 to step S900.

In step S900, before performing the time lapse operation at each observation point, the origin of the stage 101 is returned to the predetermined position, i.e. the origin return operation is performed. Also, the zoom value and the focus value are returned to predetermined initial values.

In step S901, the x-axis driving section 103 and the y-axis driving section 104 are driven, and the stage 101 is moved through the set path to the position where the observation point n can be observed and imaged.

In step S902, it is determined whether or not both the drives of the x-axis driving section 103 and the y-axis driving section 104 are stopped. This is because the operations both in the x-axis direction and the y-axis direction need to be stopped before the drives of the x-axis driving section 103 and the y-axis driving section 104 are performed in synchronization with each other in the compensation control performed in next step S903.

In step S903, the drive by the compensation control described above is performed by the x-axis driving section 103 and the y-axis driving section 104. The compensation control drives by the x-axis driving section 103 and the y-axis driving section 104 are performed in synchronization with each other as described above with reference to FIGS. 11a to 11c.

By equalizing the driving parameters in step S200 and step S903, it is possible to equalize the state of the gear, pulley, chain, belt and the like in each drive system after compensation control drive at the time of registration of the observation point and the state of the gear, pulley, chain, belt and the like in each drive system after compensation control drive at the time of the time lapse operation. Accordingly, it is possible to reduce the influence due to the twisting, distortion, expansion and contraction or slip of the gear, pulley, chain, belt or the like in each drive system, thereby handling the "position error due to stiffness, mass or the like".

In step S904, performed is control of the zoom in accordance with the zoom value registered in step S203. In this zoom control, not limited to the registered zoom value, a zoom value set in another time lapse setting provided separately may be used.

In step S905, performed is control of the focus in accordance with the focus value registered in step S203.

In step S906, control of the automatic focus is performed. In this flow, the automatic focus control is performed in addition to the focus control performed in step S905. However, it is possible to omit the focus control performed in step S905 in the case where the automatic focus control is performed.

In step S907, a figure or an enlarged view of a cell existing at or around the observation point is imaged, and the imaged picture is stored in the memory 304. The picture imaged here is a picture showing the state of the cell culture in each time period.

In step S908, it is determined whether or not the time lapse operation is completed at all the registered observation points. If n is smaller than N, the flow returns to step S901, while if n is N, the flow proceeds to step S10.

The observation and imaging functions in this embodiment can be realized by a CPU, memory, other LSI or the like of an arbitrary computer as the hardware, and can be realized by a program or the like having the observation and imaging functions loaded on the memory as the software.

The embodiment of the present invention can be modified variously without departing from the spirit of the invention as set forth in the appended claims. The embodiment described above is merely one example of the present invention, and the present invention or the meaning of terms of each constituent feature is not limited to the foregoing embodiment in construction.

The above description states that the predetermined position desired by the operator is a position preliminarily set by the operator in order to register the observation position for the time lapse operation. However, in the present invention, the technical idea of the predetermined position is not limited to above. For example, it is also possible that the operator does not set the predetermined position at the time of the preliminary registration, and set as the predetermined position is the position where the observation object is recognized by using a method of picture recognition or the like to automatically recognize the picture. Further, it is possible to set an arbitrary position as the predetermined position without performing the preliminary registration. For example, it is possible to set a position such as the center of the fluid vessel as the predetermined position.

What is claimed is:

1. An observation device comprising:
a stage on which a fluid vessel containing therein an object to be observed, the object including a cell or microorganism which is to be placed in the fluid vessel;
an observing part observing the object to be observed;
a driving part performing a stage driving for moving a position of the stage with respect to the observing part; and
a control part controlling the stage driving performed by the driving part,
the stage driving including a moving mode for moving the stage toward a predetermined position and a stop process mode for performing a compensation control after the moving mode to thereby stop the stage at the predetermined position,
wherein the control part performs a compensation control as the stop process in the stop process mode, in the compensation control the control part configured:
to determine whether or not a driving of the driving part is stopped,
to perform a first driving and a second driving after the first driving if the driving of the driving part is stopped,
not to perform the first driving and the second driving if the driving of the driving part is not stopped,
and then to stop the stage driving,
the first driving being for changing the position of the stage with respect to the observing part in a predetermined direction in accordance with a first driving parameter which is a parameter regarding a velocity or an acceleration of the stage driving, the second driving being for changing the position of the stage with respect to the observing part in a direction opposite to the predetermined direction in accordance with a second driving parameter which is a parameter regarding the velocity or the acceleration of the stage driving.

2. The observation device according to claim 1, further comprising:
a memory storing information including the position of the stage used when the control part controls the stage driving,
wherein the compensation control is performed in both the stage driving for moving the stage to the predetermined position in order for the memory to store the predetermined position of the stage and the stage driving for moving the stage to the predetermined position which is stored in the memory.

3. The observation device according to claim 1, wherein the driving part includes an X-axis driving section driving the stage in an X-axis direction and a Y-axis driving section driving the stage in a Y-axis direction which is perpendicular to the X-axis direction, and the control part performs the compensation control on the X-axis driving section and the compensation control on the Y- axis driving section when performing the stage driving in the X-axis direction or the stage driving in the Y-axis direction.

4. An observation system comprising:
the observation device according to claim 1;
a cabinet which accommodates therein the observing part and the stage included in the observation device, includes a putting into/taking out part putting the fluid vessel into and taking the fluid vessel out, and is sealed off from outside; and
an environment maintaining device maintaining a predetermined environment in the cabinet.

5. The observation device according to claim 1, wherein the predetermined direction is a clockwise direction, and wherein the direction opposite to the predetermined direction is a counterclockwise direction.

6. The observation device according to claim 5, wherein the clockwise direction and the counterclockwise direction are with respect to rotation of a gear that causes movement of the stage.

7. The observation device according to claim 5, wherein the clockwise direction and the counterclockwise direction are with respect to rotation of a gear that causes movement of the stage.

8. The observation device according to claim 1, wherein the predetermined direction is a counterclockwise direction, and wherein the direction opposite to the predetermined direction is a clockwise direction.

9. The observation device according to claim 1, wherein zoom control and focus control on the stage are only performed after the driving of the driving part is determined to have stopped.

10. A computer-implemented control method of an observation device comprising a stage on which a fluid vessel containing therein an object to be observed such as a cell or microorganism is to be placed, an observing part observing the object to be observed, and a driving part performing a stage driving for moving a position of the stage with respect to the observing part, the stage driving including a moving mode for moving the stage toward a predetermined position and a stop process mode for performing a compensation control after the moving mode to thereby stop the stage at the predetermined position, the control method of the observation device comprising the steps of:

controlling the stage driving performed by the driving part; and performing a compensation control as the stop process in the stop process mode by a control part, in the compensation control the computer:

determining whether or not a driving of the driving part is stopped;

performing a first driving and a second driving after the first driving if the driving of the driving part is stopped, not performing the first driving and the second driving if the driving of the driving part is not stopped, and then stopping the stage driving, the first driving being for changing the position of the stage with respect to the observing part in a predetermined direction in accordance with a first driving parameter which is a parameter regarding a velocity or an acceleration of the stage driving, the second driving being for changing the position of the stage with respect to the observing part in a direction opposite to the predetermined direction in accordance with a second driving parameter which is a parameter regarding the velocity or the acceleration of the stage driving.

11. The computer-implemented control method according to claim 10, wherein the predetermined direction is a clockwise direction, and wherein the direction opposite to the predetermined direction is a counterclockwise direction.

12. The computer-implemented control method according to claim 11, wherein the clockwise direction and the counterclockwise direction are with respect to rotation of a gear that causes movement of the stage.

13. The computer-implemented control method according to claim 10, wherein the predetermined direction is a counterclockwise direction, and wherein the direction opposite to the predetermined direction is a clockwise direction.

14. The computer-implemented control method according to claim 13, wherein the clockwise direction and the counterclockwise direction are with respect to rotation of a gear that causes movement of the stage.

15. The computer-implemented control method according to claim 10, further comprising, after the driving of the driving part is stopped:
performing zoom control on the stage; and
performing focus control focus control on the stage.

* * * * *